United States Patent
Norikane et al.

(10) Patent No.: US 8,105,742 B2
(45) Date of Patent: Jan. 31, 2012

(54) METHOD AND APPARATUS FOR MANUFACTURING TONER AND TONER MANUFACTURED BY THE APPARATUS AND METHOD

(75) Inventors: Yoshihiro Norikane, Yokohama (JP); Shinji Ohtani, Shizuoka-ken (JP); Yohichiroh Watanabe, Fuji (JP); Kazumi Suzuki, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 820 days.

(21) Appl. No.: 12/120,822

(22) Filed: May 15, 2008

(65) Prior Publication Data

US 2008/0286680 A1 Nov. 20, 2008

(30) Foreign Application Priority Data

May 16, 2007 (JP) ................................ 2007-130926

(51) Int. Cl.
*B28B 1/08* (2006.01)
*G03G 9/00* (2006.01)

(52) U.S. Cl. ............... 430/108.1; 430/110.4; 430/137.2; 425/6

(58) Field of Classification Search ............... 430/108.1, 430/110.4, 137.2; 425/6
See application file for complete search history.

(56) References Cited

U.S. PATENT DOCUMENTS

| | | | |
|---|---|---|---|
| 6,852,463 B2 * | 2/2005 | Teshima | ..................... 430/110.3 |
| 2003/0224271 A1 | 12/2003 | Teshima | |
| 2006/0210909 A1 * | 9/2006 | Ohtani | ........................ 430/137.1 |
| 2006/0240354 A1 | 10/2006 | Ohtani | |
| 2008/0063971 A1 * | 3/2008 | Watanabe et al. | .......... 430/110.4 |

FOREIGN PATENT DOCUMENTS

| | | |
|---|---|---|
| EP | 1344562 A2 | 9/2003 |
| EP | 1703332 A2 | 9/2006 |
| JP | 57-201248 | 12/1982 |
| JP | 7-152202 | 6/1995 |
| JP | 3786034 | 3/2006 |
| JP | 3786035 | 3/2006 |
| JP | 2006-293320 | 10/2006 |
| JP | 2006-297325 | 11/2006 |

OTHER PUBLICATIONS

Jul. 8, 2009 European search report in connection with a counterpart European patent application No. 08 25 1730.

* cited by examiner

*Primary Examiner* — Thorl Chea
(74) *Attorney, Agent, or Firm* — Cooper & Dunham LLP

(57) ABSTRACT

A method for manufacturing a toner, including periodically forming liquid droplets of a toner constituent liquid comprising a resin and a colorant by vibrating a thin film having a plurality of holes provided on a retention part thereof to discharge the liquid droplets of the toner constituent liquid from the plurality of holes and forming toner particles by solidifying the liquid droplets discharged from the plurality of holes. In periodically forming the liquid droplets of the toner constituent liquid, a flow of gas in a direction of discharge of the liquid droplets is formed by a gas flow generation unit provided downstream from the thin film relative to the direction of discharge of the liquid droplets, including a tapered part forming an aperture corresponding to a hole formation area of the thin film.

15 Claims, 11 Drawing Sheets

METHOD AND APPARATUS FOR MANUFACTURING TONER AND TONER MANUFACTURED BY THE APPARATUS AND METHOD

BACKGROUND

1. Technical Field

The present specification relates to a method and apparatus for manufacturing a toner, and a toner manufactured by the method and apparatus.

2. Description of the Background

In electrophotography, electrostatic recording, electrostatic printing, etc., a developer is adhered to an image bearing member such as an electrostatic latent image bearing member on which an electrostatic latent image is formed, transferred from the image bearing member onto a transfer medium such as paper, and finally fixed on the transfer medium.

As the developer configured to develop the electrostatic latent image formed on the image bearing member, a two-component developer, which includes a carrier and a toner, and a one-component developer consisting essentially of a toner (e.g., magnetic toner and non-magnetic toner) are known.

As a dry toner for use in electrophotography, electrostatic recording, electrostatic printing, etc., a pulverized toner, in which a toner binder such as a styrene resin and a polyester resin, a colorant, etc. are melt-kneaded and pulverized, is widely used.

Recently, polymerized toners manufactured by polymerization methods such as suspension polymerization and emulsion polymerization aggregation have gained attention. Published unexamined Japanese patent application No. (hereinafter referred to as JP-A) 07-152202, for example, discloses a polymer dissolution suspension method. In this method, toner components are dispersed and/or dissolved in a volatile solvent such as an organic solvent having a low boiling point to prepare a toner component mixture liquid. The prepared mixture liquid is emulsified in an aqueous medium containing a dispersant to form droplets of the mixture liquid. Finally, the volatile solvent is removed from the droplets to prepare toner particles while contracting the volume of the droplets.

Unlike suspension polymerization methods and emulsion polymerization aggregation methods, the polymer dissolution suspension method has the advantage that various kinds of resins can be used. For example, a polyester resin, which is useful for obtaining a full-color image having transparency and smoothness, can be used for this method.

Since the polymerized toners are prepared in an aqueous medium containing a dispersant, the dispersant tends to remain on the surface of the toner particles, which degrades chargeability and stability of the toner particles, and removing the remaining dispersant requires large quantities of water. Thus, the polymerization methods are not necessarily satisfactory.

JP-A 57-201248 discloses a spray drying method that is well known as a method for manufacturing a toner without using an aqueous medium. In this method, a mixture of toner constituents in a melted state or a liquid in which toner constituents are dissolved is discharged from various atomizers as fine particles, and the fine particles thus discharged are dried to obtain toner particles. Because an aqueous medium is not required, the above-described problems can be circumvented.

However, the toner particles manufactured with the spray drying method are relatively coarse and large, and tend to have a larger particle diameter distribution, degrading the quality of the toner.

Japanese Patent No. (hereinafter referred to as JP) 3786034 discloses a method and apparatus for manufacturing a toner in which microdroplets of a toner constituent liquid formed by piezoelectric pulsation are dried and solidified to obtain toner particles. JP 3786035 discloses a method for manufacturing a toner in which microdroplets of a toner constituent liquid formed by thermal expansion in a nozzle from which the toner constituent liquid is discharged are dried and solidified to obtain toner particles.

In the apparatuses disclosed in JP 3786034 and JP 3786035, a gas flow feed means is provided. A gas supplied from the gas flow feed means is injected from each of one or more gas injection openings provided between head sections of an apparatus through a duct at a substantially constant pressure. Therefore, particles of the raw material intermittently injected from a discharge part of the apparatus are conveyed at regular intervals and solidified.

However, in the above-described methods and apparatuses, liquid droplets are discharged from a single nozzle by a single piezoelectric element. As a result, a number of liquid droplets discharged per unit of time is limited, decreasing productivity.

Moreover, a more complicated configuration is required to supply a gas to each discharging part. Furthermore, when a direction of discharge of the liquid droplets and a direction of a gas flow is uncontrolled, the liquid droplets initially discharged separately from the nozzle may be combined together, especially in an area where a frequency of piezoelectric pulsation exceeds 100 kHz.

To solve the above-described problems, the present inventors have proposed a method and apparatus for manufacturing a toner disclosed in JP-A 2006-293320, in which a nozzle is vibrated by expansion and contraction of a piezoelectric element serving as a vibration generating means, so that liquid droplets of a toner constituent liquid are discharged from the nozzle or nozzles at a constant frequency and solidified to form toner particles of generally uniform diameter. In addition, in JP-A 2006-297325, the present inventors have also proposed a toner manufacturing apparatus including a discharging member having discharge holes, and vibration means configured to apply vibration to the discharging member at a predetermined frequency. The discharging member is vibrated by the vibration means so that liquid droplets of a toner constituent liquid are discharged from the discharge holes, and are dried and solidified to form toner particles.

In JP-A 2006-293320, because the piezoelectric element is provided around the nozzle to vibrate the nozzle by expansion and contraction of the piezoelectric element, the nozzle is vibrated only in an area corresponding to an opening between adjacent piezoelectric elements, which somewhat limits vibration amplitude. Consequently, due to such more limited vibration amplitude the nozzle may be susceptible to clogging when toner constituent liquid having a high viscosity of, for example, 10 mPa·s, in which a large amount of solid components is dispersed, is discharged from the nozzle. Although a configuration thereof is not specifically described, the toner manufacturing apparatus disclosed in JP-A 2006-297325 provides almost the same effect as that of the method and apparatus for manufacturing a toner disclosed in JP-A 2006-293320, and therefore may be prone to the same type of problem.

SUMMARY

In view of the foregoing, exemplary embodiments of the present invention provide a method for efficiently and reliably manufacturing a toner over time, and an apparatus for manufacturing a toner using such a method. With the above-described method and apparatus, a high quality toner having high fluidity and chargeability can be stably and reliably manufactured.

In one exemplary embodiment, a method for manufacturing a toner includes periodically forming liquid droplets of a toner constituent liquid comprising a resin and a colorant by vibrating a thin film having a plurality of holes provided on a retention part thereof to discharge the liquid droplets of the toner constituent liquid from the plurality of holes and forming toner particles by solidifying the liquid droplets discharged from the plurality of holes. In periodically forming the liquid droplets of the toner constituent liquid, a flow of gas in a direction of discharge of the liquid droplets is formed by a gas flow generation unit provided on a downstream side from the thin film relative to the direction of discharge of the liquid droplets and including a tapered part forming an aperture opposite a hole formation area of the thin film.

Another exemplary embodiment provides an apparatus for manufacturing a toner, including a liquid droplet formation unit configured to periodically form liquid droplets of a toner constituent liquid comprising a resin and a colorant by vibrating a thin film having a plurality of holes provided on a retention part thereof to discharge the liquid droplets of the toner constituent liquid from the plurality of holes; a toner particle formation unit configured to form toner particles by solidifying the liquid droplets of the toner constituent liquid discharged from the plurality of holes; and a gas flow generation unit configured to form a flow of gas in a direction of discharge of the liquid droplets of the toner constituent liquid provided on a downstream side from the thin film relative to the direction of discharge of the liquid droplets and including a tapered part forming an aperture opposite a hole formation area of the thin film.

Yet another exemplary embodiment provides a toner comprising a resin and a colorant manufactured by the method and the apparatus described above.

Additional features and advantages of the present invention will be more fully apparent from the following detailed description of exemplary embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein like reference numerals designate identical or corresponding parts throughout the several views and wherein.

DETAILED DESCRIPTION OF THE EXEMPLARY EMBODIMENTS

Figure 1:
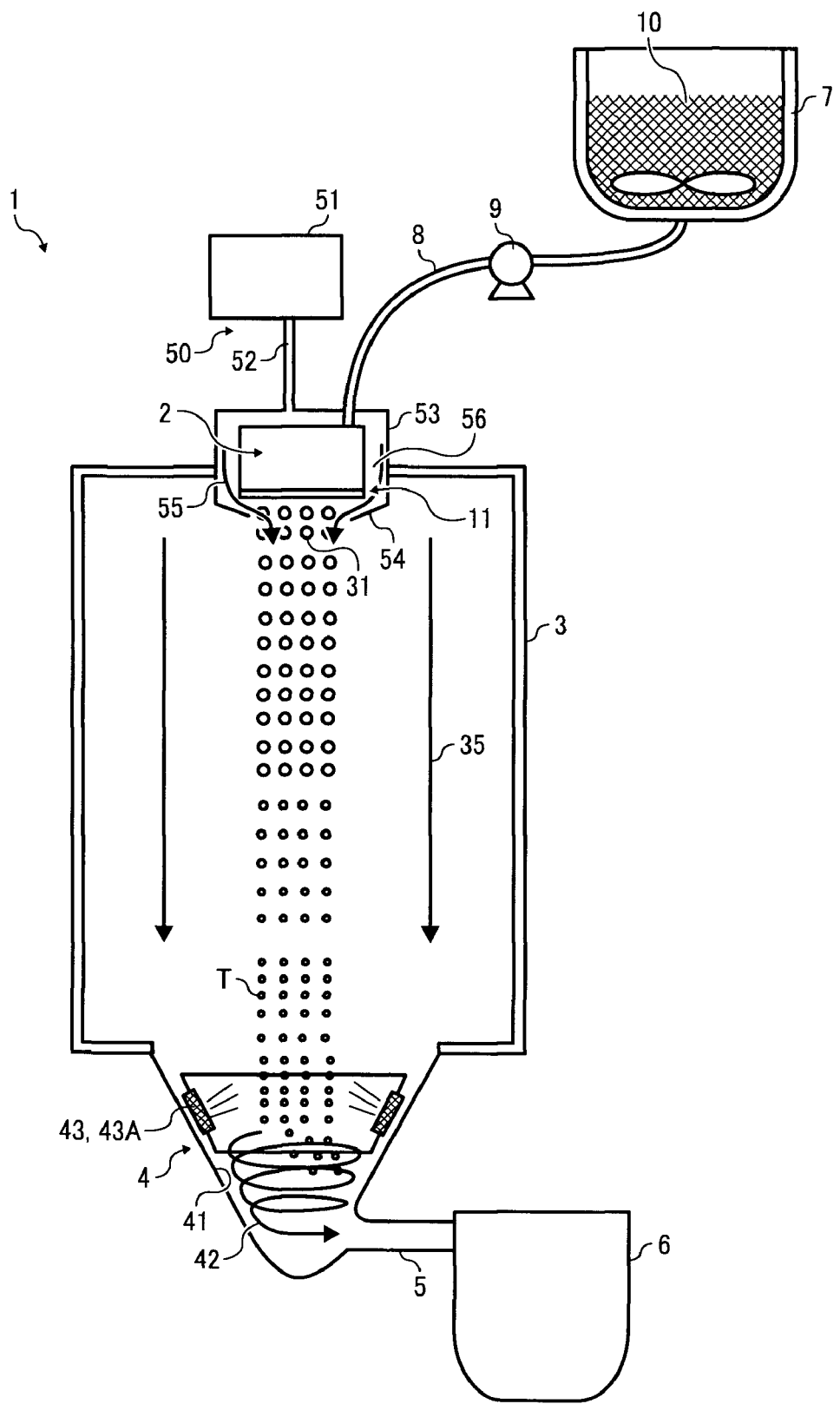
FIG. 1 is a schematic view illustrating an embodiment of an apparatus for manufacturing a toner according to the present invention.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

FIG. 1 is a schematic view illustrating an embodiment of a toner manufacturing apparatus according to the present invention.

A toner manufacturing apparatus 1 includes a liquid droplet injection unit 2 serving as a liquid droplet forming means; a toner particle formation part 3 serving as a toner particle forming means configured to form toner particles T by solidifying liquid droplets of a toner constituent liquid 10 discharged from the liquid droplet injection unit 2, provided beneath the liquid droplet injection unit 2; a toner collection part 4 configured to collect the toner particles T formed in the toner particle formation part 3; a toner retention part 6 configured to retain the toner particles T transported from the toner collection part 4 through a tube 5; a raw material container 7 configured to contain the toner constituent liquid 10; a pipe 8 configured to pass the toner constituent liquid 10 from the raw material container 7 to the liquid droplet injection unit 2; and a pump 9 configured to supply the toner constituent liquid 10 under pressure when the apparatus is in operation.

The toner constituent liquid 10 is self-supplied from the raw material container 7 when the liquid droplet injection unit 2 discharges liquid droplets. When the apparatus is in operation, the toner constituent liquid 10 is supplementarily supplied by the pump 9. The toner constituent liquid 10 is a solution or dispersion in which toner constituents comprising a binder resin and a colorant are dissolved or dispersed in a solvent.

Although only one liquid droplet injection unit 2 is fixed to the toner particle formation part 3 in the toner manufacturing apparatus 1 illustrated in FIG. 1, in the interest of improved productivity preferably a plurality of liquid droplet injection units 2 are arranged on a top surface of the toner particle formation part 3. Control requirements dictate that preferably the number of the liquid droplet injection units 2 ranges from about 100 to about 1,000. In this case, the toner constituent liquid 10 is supplied to each of the liquid droplet injection units 2 from the raw material container 7 through the pipe 8. As a result, a larger amount of the liquid droplets can be discharged from the liquid droplet injection units 2, improving production efficiency.

Figure 3:
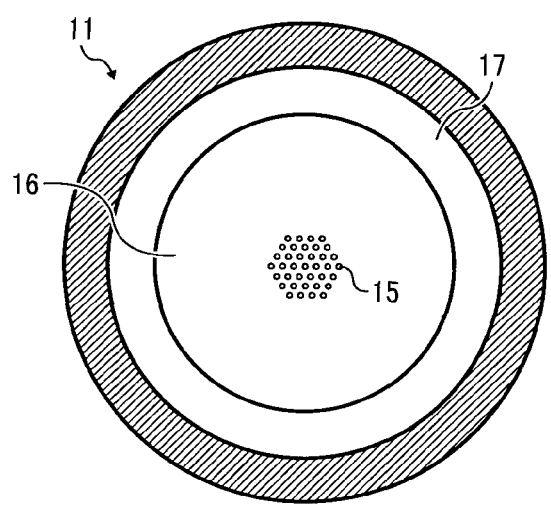
FIG. 3 is a schematic bottom view illustrating the liquid droplet injection unit illustrated in FIG. 2.
Figure 4:
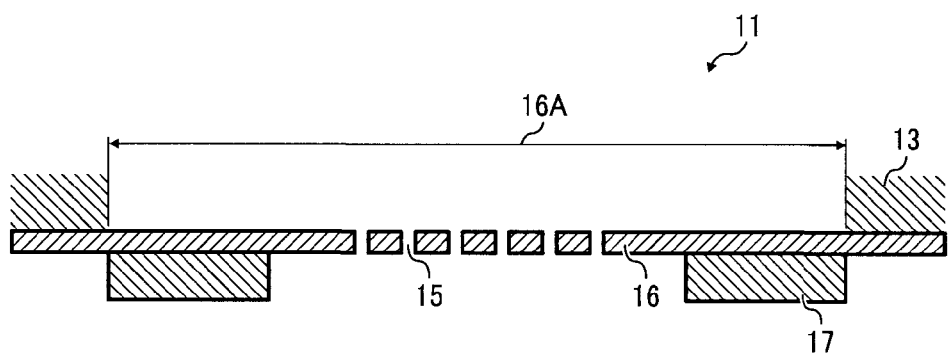
FIG. 4 is an enlarged cross-sectional view illustrating a liquid droplet discharging means of the liquid droplet injection unit.

An example of the liquid droplet injection unit 2 is described in detail below with reference to FIGS. 2 to 4.

Figure 2:
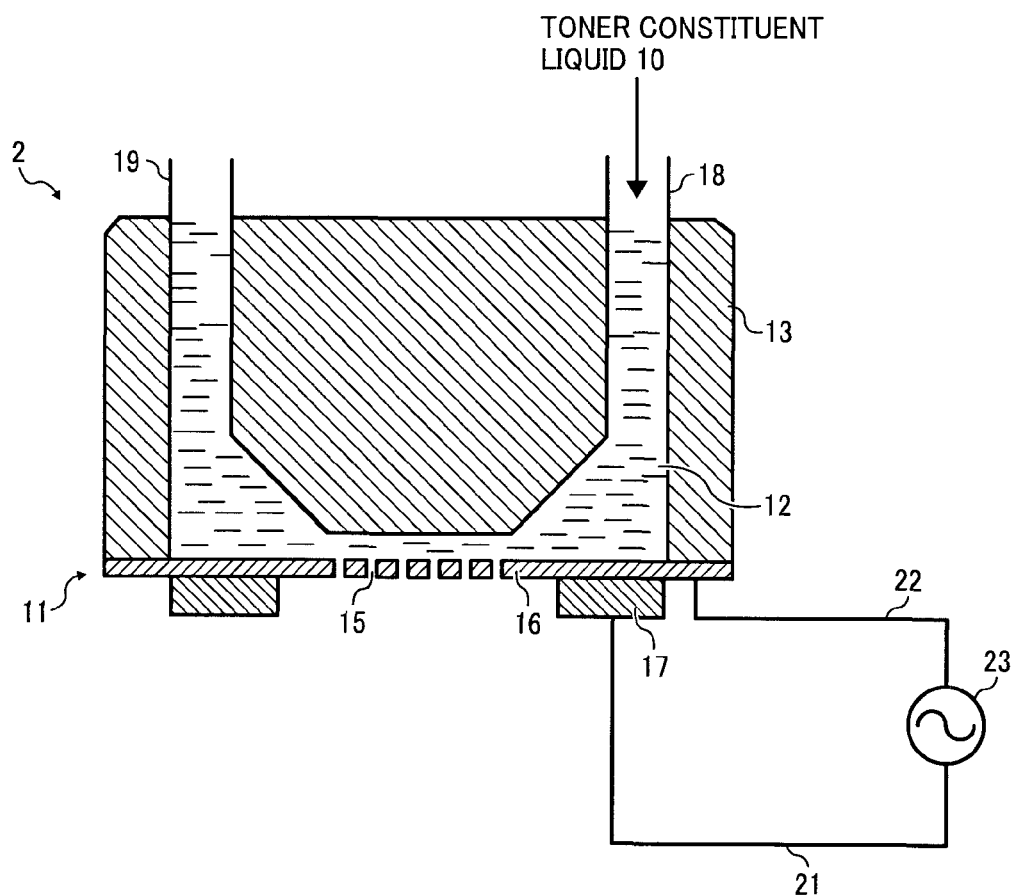
FIG. 2 is an enlarged view illustrating an embodiment of a liquid droplet injection unit of the apparatus for manufacturing a toner illustrated in FIG. 1.

FIG. 2 is an enlarged cross-sectional view illustrating an embodiment of the liquid droplet injection unit 2. FIG. 3 is a schematic bottom view illustrating the liquid droplet injection unit 2 illustrated in FIG. 2. FIG. 4 is an enlarged cross-sectional view illustrating a liquid droplet discharging means of the liquid droplet injection unit 2.

The liquid droplet injection unit 2 includes a liquid droplet discharging means 11 configured to discharge liquid droplets of the toner constituent liquid 10 comprising a binder resin and a colorant, and a flow path member 13 configured to form a liquid flow path (i.e., retention part) 12 configured to supply the toner constituent liquid 10 to the liquid droplet discharging means 11.

The liquid droplet discharging means 11 includes a thin film 16 including a plurality of holes 15, and a ring-shaped (annular) electromechanical transducer 17 serving as a vibration generating means configured to vibrate the thin film 16. The outermost portion of the thin film 16 indicated by a shaded area in FIG. 3 is fixed to the flow path member 13 with a solder or a binder resin material that is insoluble in the toner constituent liquid 10. The annular electromechanical transducer 17 is provided surrounding a deformable region (i.e., a region not fixed to the flow path member 13) 16A of the thin film 16. The annular electromechanical transducer 17 generates a flexural vibration when a driving voltage (driving signal) having a specific frequency is applied from a driving signal generating source 23 through lead wires 21 and 22.

Materials used for the thin film 16 and a shape of the holes 15 are not particularly limited. However, preferably the thin film 16 is formed from a metal plate having a thickness of from 5 to 500 μm, and each of the holes 15 preferably has an opening diameter of from 3 to 35 μm so as to form extremely uniform-sized liquid droplets when the toner constituent liquid 10 is discharged therefrom. The opening diameter here refers to the diameter when the holes 15 form a perfect circle, and to the minor axis diameter when the holes 15 form an ellipse. The number of the holes 15 is preferably in a range of from 2 to 3,000.

The annular electromechanical transducer 17 is not particularly limited so long as it is capable of applying a stable vibration to the thin film 16 at a specific frequency. For example, bimorph piezoelectric elements capable of generating a flexural vibration are preferably used. As the piezoelectric element, for example, a piezoelectric ceramic such as lead zirconate titanate (PZT) can be used. Such a substance is often laminated because it typically has a small displacement. Other specific examples of the piezoelectric element include, but are not limited to, piezoelectric polymers such as polyvinylidene fluoride (PVDF), and single crystals of quartz, $LiNbO_3$, $LiTaO_3$, $KNbO_3$, etc.

A duct 18 connected to the pipe 8 for supplying the toner constituent liquid 10 to the liquid flow path 12 and a bubble discharging tube (or a liquid circulation tube) 19 are respectively connected to at least one portion of the flow path member 13. The liquid droplet injection unit 2 is mounted on the top surface of the toner particle formation part 3 by a support member, not shown, attached to the flow path member 13. Alternatively, the liquid droplet injection unit 2 may be fixed on a side surface or a bottom surface of the toner particle formation part 3.

Since the annular electromechanical transducer 17 is provided surrounding the deformable region 16A of the thin film 16 including the plurality of holes 15, the displacement of the thin film 16 is relatively large compared to that of the thin film 16 when it is supported by another type of electromechanical transducer which is not annular. Therefore, the plurality of holes 15 can be arranged on a relatively large area (having a diameter φ of not less than 1 mm). As a result, a large number of liquid droplets can be simultaneously and reliably discharged from the plurality of holes 15.

Figure 5A:
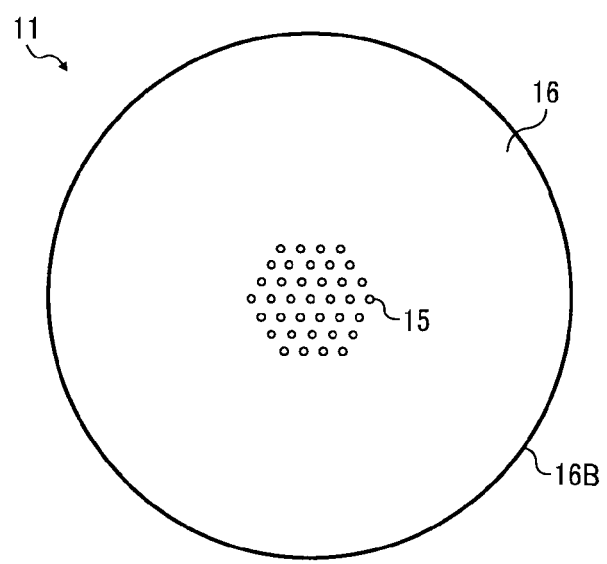
FIGS. 5A and 5B are schematic views respectively illustrating a thin film provided on the liquid droplet discharging means used for forming liquid droplets.
Figure 5B:
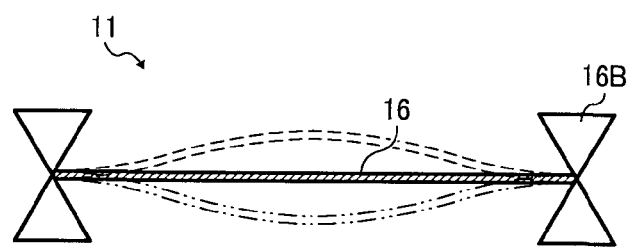
Figure 6:
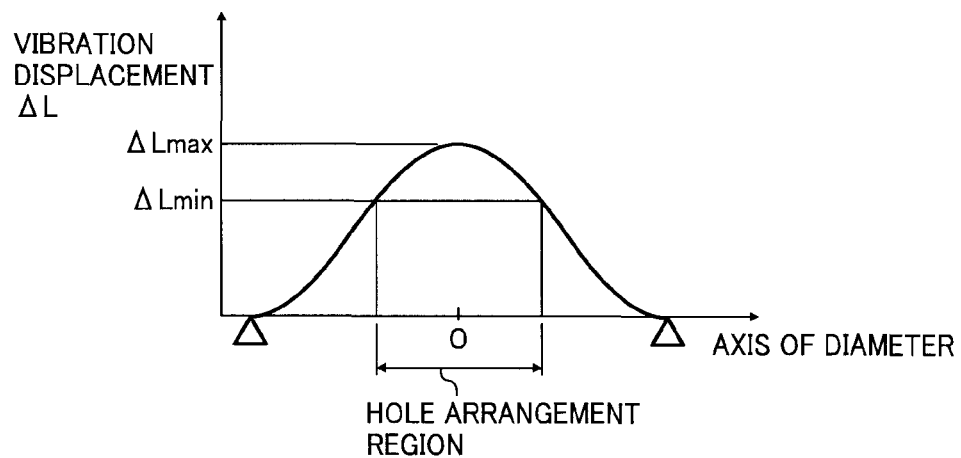
FIG. 6 is a cross-sectional view explaining how the thin film vibrates in a primary vibration mode.

FIGS. 5A and 5B are schematic bottom and cross-sectional views, respectively, illustrating an embodiment of the thin film 16. FIG. 6 is a cross-sectional view of the thin film 16 for explaining how the thin film 16 vibrates in a primary vibration mode. When a peripheral portion 16B of the thin film 16, which is a simple circular film, is fixed, or more specifically, when a peripheral portion of the deformable region 16A is fixed, the thin film 16 vibrates as shown in FIG. 6. In other words, the thin film 16 periodically vibrates in a vertical direction while a center point O displaces at the maximum displacement ΔLmax and the peripheral portion forms a node.

Figure 7:
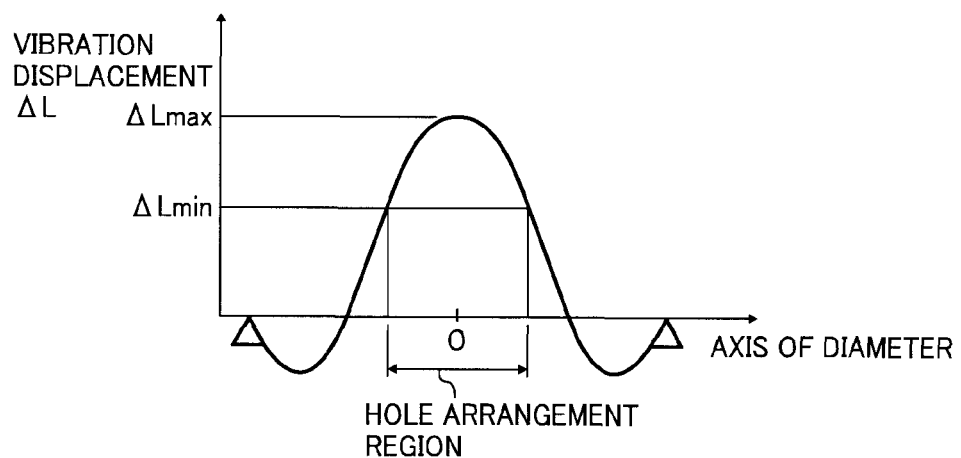
FIG. 7 is a cross-sectional view explaining how the thin film vibrates in a secondary vibration mode.
Figure 8:
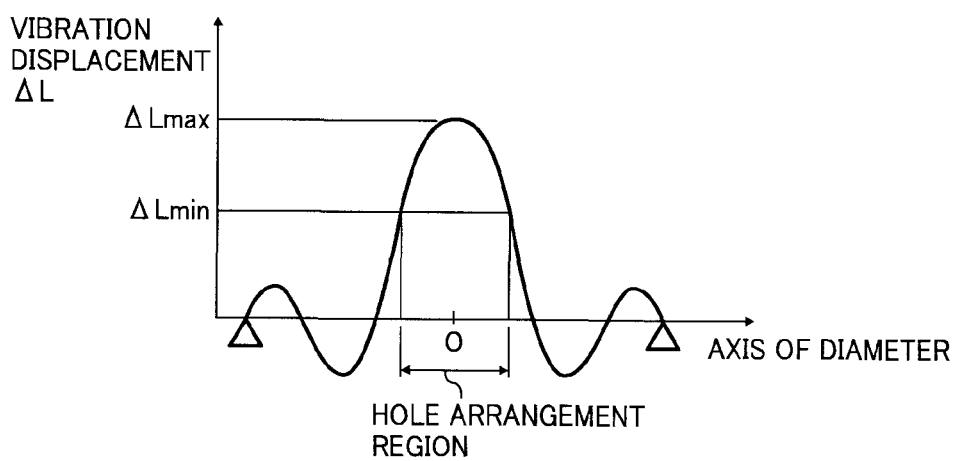
FIG. 8 is a cross-sectional view explaining how the thin film vibrates in a tertiary vibration mode.
Figure 9:
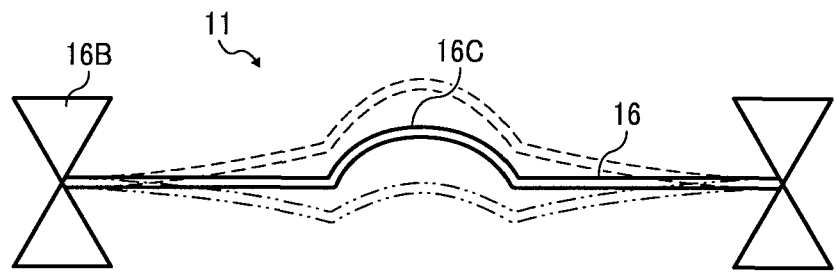
FIG. 9 is a cross-sectional view illustrating the thin film having a convexity in a center portion thereof.

As illustrated in FIG. 6, the thin film 16 preferably vibrates only in a vertical direction while forming a node on the peripheral portion. It is known that the thin film 16 may vibrate with the secondary or tertiary vibration modes as illustrated in FIGS. 7 and 8, respectively. In these cases, one or more nodes are concentrically formed in the thin film 16 with a circular shape, and the thin film 16 flexes axisymmetrically. When the thin film 16 has an upward convexity 16c in the center portion as illustrated in FIG. 9, the movement direction of liquid droplets and the amplitude can be controlled.

When the thin film 16 with a circular shape vibrates, acoustic pressure Pac is generated in the toner constituent liquid 10 presenting in the vicinity of the holes 15. The acoustic pressure Pac is proportional to the vibration rate Vm of the thin film 16. It is known that the acoustic pressure Pac generated as a counter-reaction to a radiation impedance of Zr of the medium (i.e., toner constituent liquid). The acoustic pressure Pac is represented by the following equation:

$$Pac(r,t)=Zr \cdot Vm(r,t) \tag{1}$$

The vibration rate Vm of the thin film 16 is a function of time because it periodically varies with time. Periodic variations such as a sine wave and a square wave can be formed. The vibration rate Vm is also a function of location because the vibration amplitude varies by location. As mentioned above, the thin film 16 vibrates axisymmetrically. Therefore, the vibration rate Vm is substantially a function of coordinates of the radius.

As a result, when an acoustic pressure Pac proportional to the vibration rate Vm of the thin film 16 generates, the toner constituent liquid 10 is discharged to a gas phase due to the periodic variation of the acoustic pressure Pac. The toner constituent liquid 10 periodically discharged to a gas phase forms spherical particles due to the difference in surface tension between the liquid phase and the gas phase. Thus, liquid droplets are periodically formed, and are discharged from the plurality of holes 15.

Figure 10A:
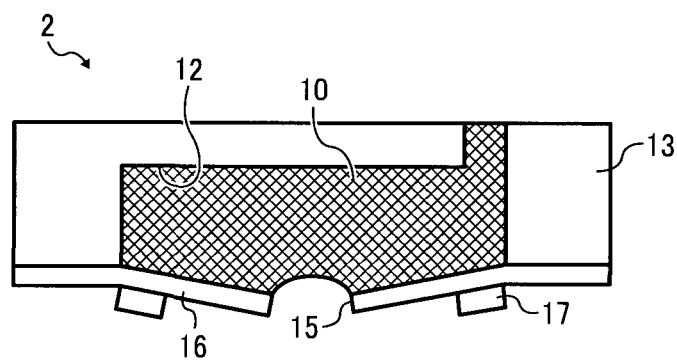
FIGS. 10A and 10B are schematic views respectively illustrating formation of liquid droplets performed by the liquid droplet formation part.
Figure 10B:
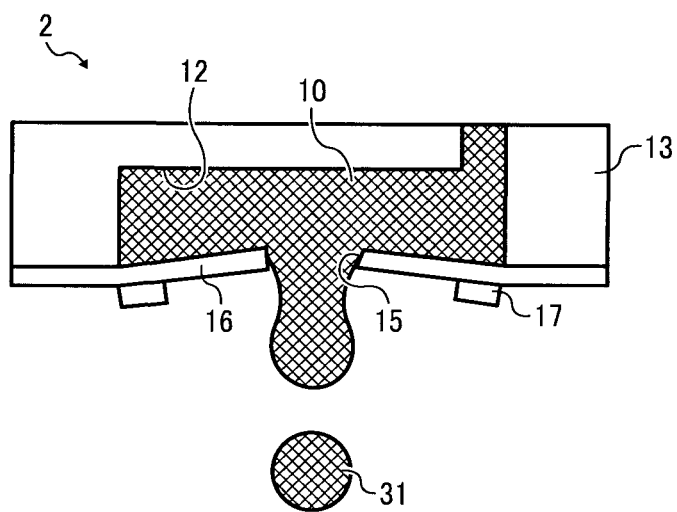

FIGS. 10A and 10B are schematic views illustrating formation of the liquid droplets of the toner constituent liquid 10, respectively. The annular electromechanical transducer 17, provided surrounding the deformable region 16A of the thin film 16, applies a flexural vibration to the thin film 16 so that the thin film 16 vibrates between a state in which the thin film 16 is bent in a direction away from the liquid flow path 12 as illustrated in FIG. 10A and a state in which the thin film 16 is bent toward the liquid flow path 12 as illustrated in FIG. 10B. As a result, liquid droplets 31 of the toner constituent liquid 10 are formed due to the vibration of the thin film 16, and the liquid droplets 31 are discharged from the holes 15.

The vibration frequency of the thin film 16 capable of forming liquid droplets is typically from 20 kHz to 2.0 MHz, and preferably from 50 kHz to 500 kHz. When the frequency is not less than 20 kHz, the colorant and wax particles are well dispersed in the toner constituent liquid 10 due to the excitation of the liquid.

Further, when the acoustic pressure is not less than 10 kPa, the colorant and wax particles are well dispersed in the toner constituent liquid 10.

The larger the vibration amplitude near the hole 15 of the thin film 16, the larger the diameter of the liquid droplet 31 discharged therefrom. When the vibration amplitude is too small, either undersized liquid droplets are formed or no liquid droplet is formed at all. In order to reduce variations in liquid droplet size by hole location, preferably the holes 15 are deployed appropriately.

Specifically, in the present invention, preferably the holes 15 are provided in a region where the ratio ($\Delta L_{max}/\Delta L_{min}$) of the maximum vibration amplitude $\Delta L_{max}$ to the minimum vibration amplitude $\Delta L_{min}$ is not greater than 2.0, as illustrated in FIGS. 6 to 8. In this case, variations in the size of the liquid droplets 31 can be reduced so that the resultant toner can provide high quality images.

One of main factors causing variations in size of the liquid droplets 31 is generation of undersized liquid droplets having a diameter approximately one tenth that of the normal sized liquid droplets. Experiments performed using different types of toner constituent liquids indicate that, when the toner constituent liquid has a viscosity of not greater than 20 mPa·s and a surface tension of from 20 to 75 mN/m, undersized liquid droplets are formed in the same region described above. Therefore, the acoustic pressure must be from 10 to 500 kPa, and more preferably not greater than 100 kPa. In other words, generation of the undersized liquid droplets can be suppressed by arranging the plurality of holes 15 on the thin film 16 such that the acoustic pressure remains in a range of from 10 to 500 kPa, and more preferably not greater than 100 kPa.

Figure 11:
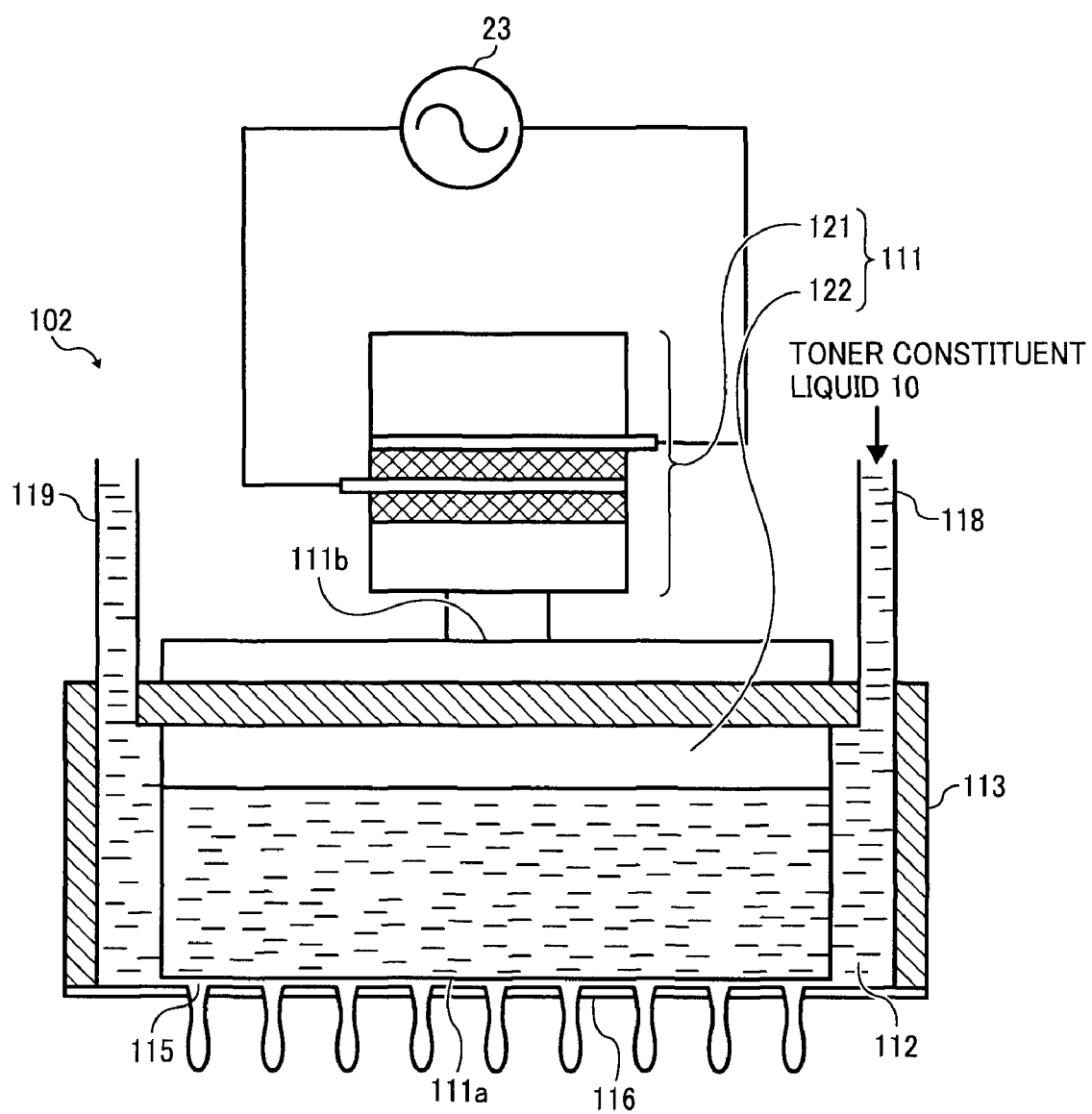
FIG. 11 is a vertical cross-sectional view illustrating another example of the liquid droplet injection unit.
Figure 12:
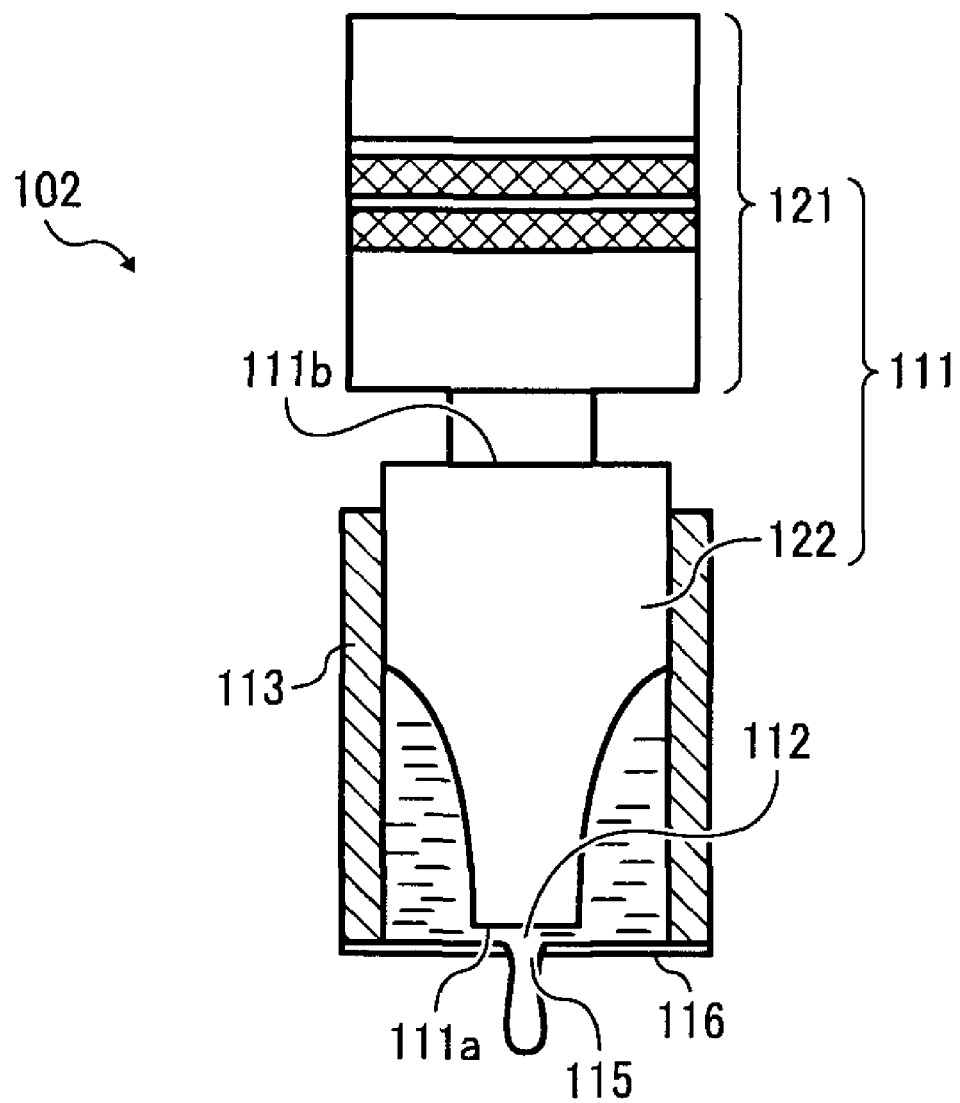
FIG. 12 is a vertical cross-sectional view illustrating another example of the liquid droplet injection unit as viewed laterally from a left lateral side.

Another example of the liquid droplet injection unit is described with reference to FIGS. 11 and 12. FIG. 11 is a vertical cross-sectional view illustrating a liquid droplet injection unit 102 viewed from the front. FIG. 12 is a vertical cross-sectional view illustrating the same viewed from a left lateral side.

The liquid droplet injection unit 102 includes a thin film 116 having a plurality of holes 115, a vibration means 111 configured to vibrate the thin film 116, and a flow path member 113 configured to form a liquid flow path (i.e., retention part) 112 configured to supply the toner constituent liquid 10 comprising a binder resin and a colorant between the thin film 116 and the vibration means 111. The toner constituent liquid 10 is supplied to the liquid flow path 112 through a supply pipe 118. The liquid droplet injection unit 102 further includes a circulation pipe 119, as needed.

The vibration means 111 includes a vibration generating means 121 including two laminated piezoelectric elements configured to generate vibration, and a horn-shaped vibration amplifying means 122 configured to amplify the vibration generated from the vibration generating means 121. A vibration surface 111a of the vibration means 111 is arranged parallel to the thin film 116 with the toner constituent liquid 10 in the liquid flow path 112 therebetween. The vibration surface 111a is larger than a connecting surface 111b which is provided opposite the vibration surface 111a to connect the vibration generating means 121 and the vibration amplifying means 122, as illustrated in FIG. 12.

The vibration surface 111a has a rectangular shape. The larger the ratio of a long side to a short side of the vibration surface 111a, the larger the vibration area of the thin film 116. Therefore, for greater productivity it is preferable that the ratio of the long side to the short side of the vibration surface 111a be not greater than 2.0. Configurations of other components of the liquid droplet injection unit 102, as well as materials and shapes of the components and arrangement of the holes, are the same as those of the liquid droplet injection unit 2, and therefore a description thereof is omitted.

In the liquid droplet injection unit 102, the vibration surface 111a is vibrated by driving the vibration generating means 121 of the vibration means 111. The vibration of the vibration surface 111a is transmitted to the thin film 116 so that the thin film 116 is vibrated at a predetermined frequency. As a result, the liquid droplets 31 of the toner constituent liquid 10 are periodically discharged from the holes 15 of the thin film 116.

As described above, the vibration means 111 includes the vibration generating means 121 and the vibration amplifying means 122 so as to vibrate the thin film 116. Accordingly, the thin film 116 is vibrated at a larger vibration amplitude, and a toner having a monodispersive particle diameter distribution can be efficiently manufactured. Particularly, because the vibration surface 111a is larger than the connecting surface 111b, the thin film 116 can be vibrated at a larger vibration amplitude by the vibration generating means 121 having a smaller size.

Referring back to FIG. 1, the toner manufacturing apparatus 1 further includes a gas flow generation means 50 configured to generate a flow of gas flowing in a direction of discharge of the liquid droplets 31. The gas flow generation means 50 includes a gas compressor 51, a gas duct 52, and a gas flow distributor means 53.

Figure 13:
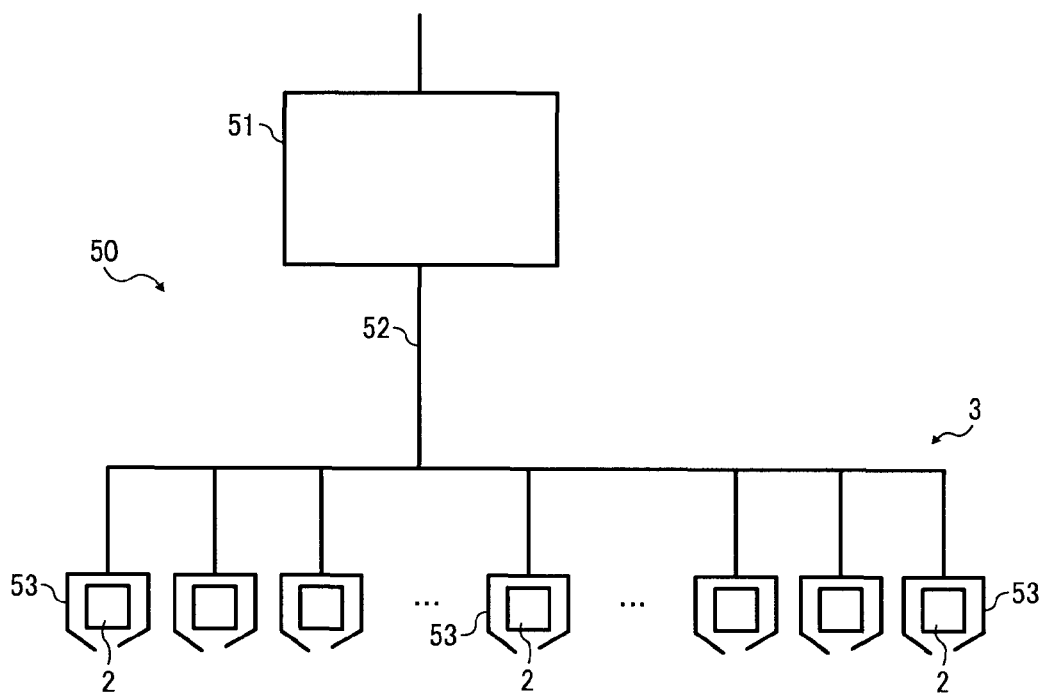
FIG. 13 is a schematic view illustrating another example of an embodiment of the gas flow generation means.
Figure 14:
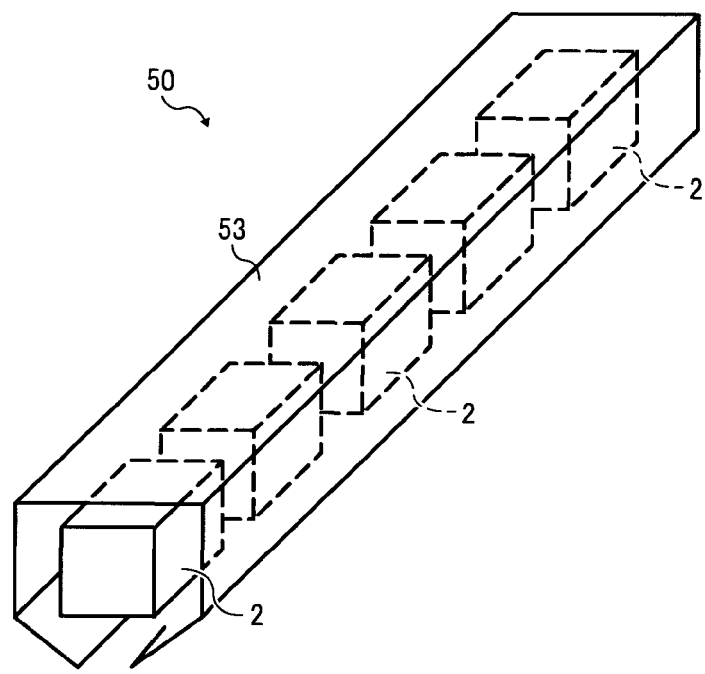
FIG. 14 is a schematic perspective view illustrating yet another example of an embodiment of the gas flow generation means.

An ordinary compressor and blower may be used as the gas compressor 51. Preferably, a single gas flow distributor means 53 is provided on a single liquid droplet injection unit 2. Therefore, when the plurality of liquid droplet injection units 2 is provided on the single toner particle formation part 3 as illustrated in FIG. 13 to be described later, preferably a flow of gas is introduced into the plurality of gas flow distributor means 53 respectively provided on the plurality of liquid droplet injection units 2 from the single gas compressor 51 through the gas duct 52. Alternatively, the plurality of liquid droplet injection units 2 may be provided to the single gas flow distributor means 53 as illustrated in FIG. 14 to be described later.

Referring back to FIG. 1, it can be seen that the gas flow distributor means 53 includes a gas flow path 56. Gas is introduced into the gas flow distributor means 53 from the gas compressor 51, and the gas flow path 56 forms a flow of gas 55 flowing in the direction of discharge of the liquid droplets 31 through an aperture formed by a tapered part 54 provided on a downstream side from the thin film 16 relative to the direction of discharge of the liquid droplets 31, corresponding to a hole formation area of the thin film 16.

Figure 15:
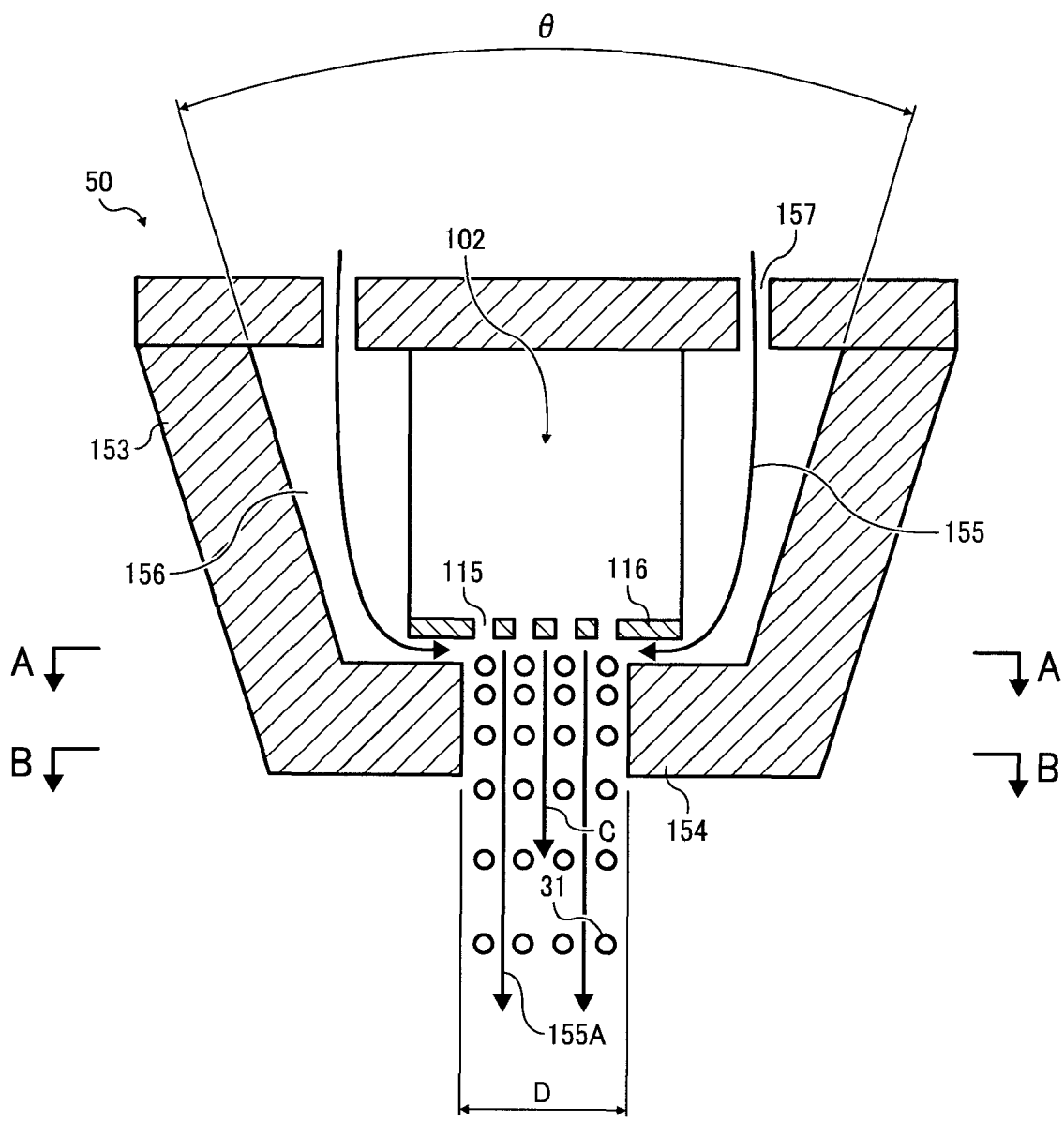
FIG. 15 is a vertical cross-sectional view illustrating the gas flow generation means viewed from a front side.
Figure 16:
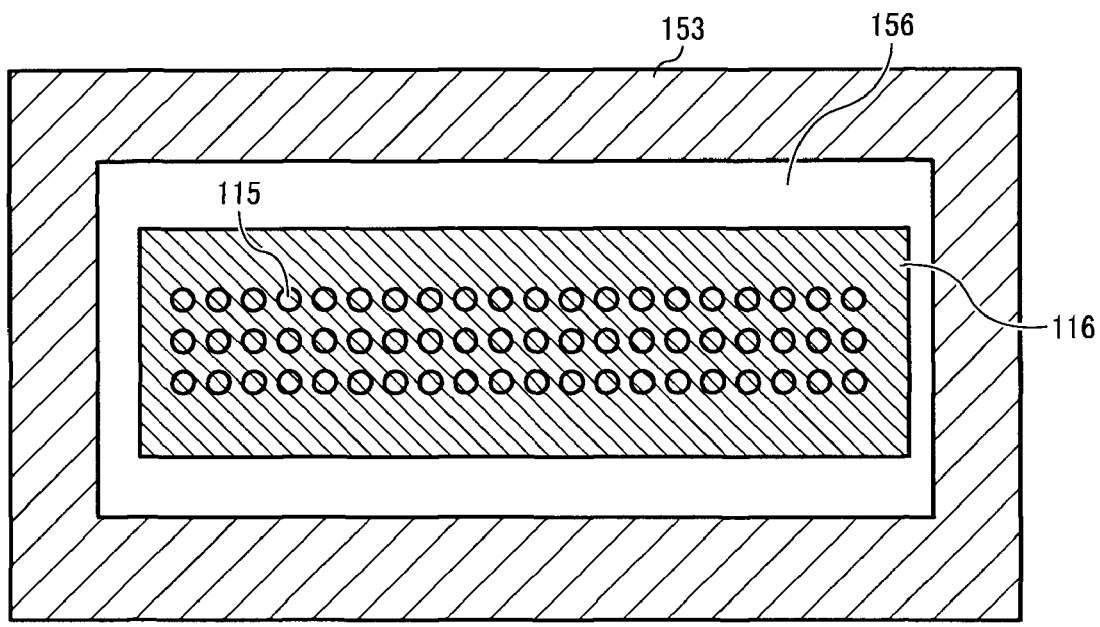
FIG. 16 is a cross-sectional view illustrating the gas flow generation means along a line A-A in FIG. 15.
Figure 17:
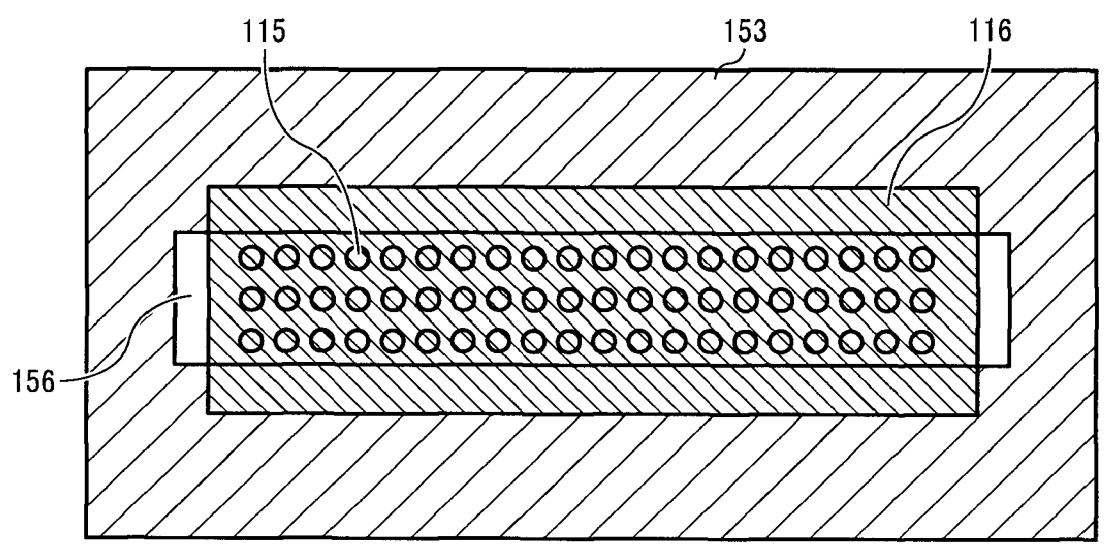
FIG. 17 is a cross-sectional view illustrating the gas flow generation means along a line B-B in FIG. 15.

An example of the gas flow generation means 50 employed in the liquid droplet injection unit 102 illustrated in FIGS. 11 and 12 is described in detail below with reference to FIGS. 15 through 17. FIG. 15 is a vertical cross-sectional view illustrating the gas flow distributor means of a gas flow generation means 50 viewed from a front side. FIG. 16 is a cross-sectional view illustrating the gas flow generation means 50 along a line A-A in FIG. 15, and FIG. 17 is a cross-sectional view illustrating the gas flow generation means 50 along a line B-B in FIG. 15.

Referring to FIG. 15, a gas flow path formation member 153 serving as the gas flow distributor means is provided around the liquid droplet injection unit 102. Pressurized gas is introduced between the gas flow path formation member 153 and the liquid droplet injection unit 102 from above through a fas leading path 157.

The gas flow path formation member 153 includes a tapered part 154 configured to constrict or narrow an gas flow path 156 so as to correspond to a hole formation area of a thin film 116 of the liquid droplet injection unit 102, provided on a downstream side from the thin film 116 relative to a direction of discharge of the liquid droplets 31 (indicated by an arrow C in FIG. 15). As a result, a speed of a flow of gas 155 introduced through the gas leading path 157 increases at the tapered part 154. Thus, a cross-sectional area of the gas flow path 156 along a line B-B in FIG. 15 shown in FIG. 17 is smaller than that of the gas flow path 156 along a line A-A in FIG. 15 shown in FIG. 16, so that the gas flow path 156 is narrowed at the tapered part 154.

A shape of the gas flow path 156 is not limited as long as the above-described requirements are satisfied, and therefore an optimal configuration is adopted to prevent the liquid droplets 31 from being combined with one another, in which an angle of introduction of the gas flow 155 is θ and an opening width of an opening formed by the tapered part 154 is D.

Therefore, the liquid droplets 31 of the toner constituent liquid 10 discharged from the holes 115 ride a flow of gas 155A which flows relatively faster than an initial discharging speed of the liquid droplets 31 because the gas flow path 156 is narrowed at the tapered part 154. As a result, an interval between each liquid droplet 31 sequentially discharged from the holes 115 is increased and the liquid droplets 31 are prevented from being combined with one another, resulting in the reliable manufacture of toner particles.

A speed of the gas flow 155 generated by the gas flow path 156 is also faster than the initial discharging speed of the liquid droplets 31 at the tapered part 154. Therefore, the interval between each liquid droplet 31 is expanded even at a high frequency, preventing collision of the liquid droplets 31.

A description is now given of the toner particle formation part 3 configured to form toner particles T by solidifying the liquid droplets 31 of the toner constituent liquid 10, with reference back to FIG. 1.

As described above, the toner constituent liquid 10 is a solution or dispersion in which toner constituents comprising a binder resin and a colorant are dissolved or dispersed in a solvent. The liquid droplets 31 of the toner constituent liquid 10 are dried and solidified to form the toner particles T. In other words, the toner particle formation part 3 forms the toner particles T by drying the liquid droplets 31 of the toner constituent liquid 10 to remove the solvent therefrom.

Specifically, the toner particle formation part 3 conveys the liquid droplets 31 discharged form the holes 15 of the liquid droplet injection unit 2 by dry gas 35 flowing in a direction identical to the direction of discharge of the liquid droplets 31. As a result, the solvent is removed from the liquid droplets 31, and the toner particles T are formed. The dry gas 35 is air having a dew-point temperature of −10° C. or less under atmospheric pressure. Any air can be used as the dry gas 35 as long as the liquid droplets 31 can be dried. Specific examples of the dry gas 35 include, but are not limited to, air, nitrogen, and the like.

A description is now given of the toner collection part 4 configured to collect the toner particles T formed by the toner particle formation part 3.

The toner collection part 4 is integrally provided with the toner particle formation part 3 on a downstream side relative to a direction of movement of the toner particles T. The toner collection part 4 includes a tapered surface 41, a diameter of which is gradually reduced from an entry side (a side connecting to the toner particle formation part 3) to an exit side. In the toner collection part 4, a swirling gas flow 42 downstream is generated by using a suction pump, not shown, to collect the toner particles T. Therefore, a centrifugal force is generated by the swirling gas flow 42, and the toner particles T are reliably collected and conveyed to the toner retention part 6 provided on a downstream side from the toner collection part 4.

The toner collection part 4 further includes a neutralizing means 43 at the entry thereof to temporarily neutralize charges of the toner particles T formed by the toner particle formation part 3. The neutralizing means 43 includes a soft (lower energy) X-ray irradiation device 43A configured to irradiate the toner particles T with soft X-rays. Alternatively, the neutralizing means 43 may include a plasma irradiation device configured to irradiate the toner particles T with plasma.

The toner particles T collected by the toner collection part 4 are conveyed through the tube 5 and stored in the toner retention part 6. When the toner collection part 4, the tube 5, and the toner retention part 6 are formed of a conductive material, it is preferable that the above-described components be grounded. Preferably, the toner manufacturing apparatus 1 is of explosion-protected construction. The toner particles T may be conveyed from the toner collection part 4 to the toner retention part 6 either under pressure or by suction from the toner retention part 6.

A description is now given of a method for manufacturing a toner according to exemplary embodiments using the toner manufacturing apparatus 1 with the above-described configuration. In the following description, the liquid droplet injection unit 2 including the annular electromechanical transducer 17 illustrated in FIGS. 2 and 3 is used.

As described above, the toner constituent liquid 10 in which toner constituents comprising a binder resin and a colorant are dissolved or dispersed in a solvent is supplied to the liquid flow path 12 in the liquid droplet injection unit 2. The annular electromechanical transducer 17 provided on the liquid droplet discharging means 11 generates a flexural vibration when a driving voltage (driving signal) having a specific frequency is applied from the driving signal generating source 23. As a result, the thin film 16 is periodically vibrated due to the flexural vibration generated by the annular electromechanical transducer 17. The toner constituent liquid 10 supplied to the liquid flow path 12 is discharged from the plurality of holes 15 by the vibration of the thin film 16, so that the liquid droplets 31 are periodically formed and discharged to the toner particle formation part 3 as illustrated in FIG. 1.

The liquid droplets 31 discharged to the toner particle formation part 3 are conveyed by the dry gas 35 flowing in a direction identical to the direction of movement of the liquid droplets 31. As a result, the solvent is removed from the liquid droplets 31 to form the toner particles T. The toner particles T thus formed in the toner particle formation part 3 are conveyed to the toner collection part 4 provided downstream from the toner particle formation part 3 and collected by the swirling gas flow 42. The toner particles T thus collected are further conveyed to the toner retention part 6 through the tube 5, and are stored in the toner retention part 6.

As described above, the plurality of holes 15 is provided on the liquid droplet discharging means 11 of the liquid droplet injection unit 2. Therefore, a larger number of the liquid droplets 31 is continuously discharged from the plurality of holes 15, dramatically improving productivity. Moreover, the liquid droplet discharging means 11 has a configuration in which the annular electromechanical transducer 17 is provided so as to surround the deformable region 16A of the thin film 16, so that the thin film 16 has a larger vibration amplitude. Because the plurality of holes 15 is arranged within the region having the larger vibration amplitude, a larger number of the liquid droplets 31 can be reliably discharged at a time without clogging the holes 15, reliably and efficiently manufacturing the toner particles and enabling a toner having a monodispersive particle diameter distribution to be manufactured efficiently.

In the present exemplary embodiments, a solution or a dispersion in which toner constituents comprising a binder resin and a colorant are dissolved or dispersed in a solvent is used as the toner constituent liquid 10. An organic solvent included in the liquid droplets 31 of the toner constituent liquid 10 is vaporized by the dry gas 35 in the toner particle formation part 3, causing the liquid droplets 31 contract and solidify to form the toner particles T. However, the method for forming the toner is not limited to the above-described examples.

For example, the toner constituent liquid 10 may be obtained by melting and liquefying the toner constituents, and supplied to the liquid flow path 12 being heated. Thereafter, the liquid droplets 31 of the toner constituent liquid 10 may be discharged from the holes 15, and cooled and solidified to form the toner particles T. Alternatively, the liquid droplets 31 of the toner constituent liquid 10 including thermoset materials may be discharged from the holes 15, and hardened by heat and solidified to form the toner particles T.

The toner of the present invention is manufactured by the toner manufacturing method of the present invention using the toner manufacturing apparatus described above. The toner of the present invention has a nearly monodispersive particle diameter distribution.

The toner preferably has a particle diameter distribution (i.e., the ratio of the weight average particle diameter to the number average particle diameter) of from 1.00 to 1.05, and a weight average particle diameter of from 1 to 20 μm.

The toner prepared by the toner manufacturing method of the present invention can be easily re-dispersed, (i.e., suspended) in a flow of gas by electrostatic repulsion. Therefore, the toner can be transported to the developing region of an image forming apparatus without use of the transport means typically used in conventional electrophotography. In other words, the toner can be satisfactorily transported even if the gas flow is weak. The toner can be transported to the developing region by a simple air pump to develop an electrostatic latent image. The electrostatic latent image is faithfully developed with the toner by so-called powder cloud development, in which the image formation is not disturbed by the gas flow.

In addition, the toner of the present invention can also be used for conventional developing methods. In this case, image forming members such as a carrier and a developing sleeve do not need to perform friction-charging while transporting a toner. Therefore, various kinds of materials can be used for the image forming members, resulting in improved durability and reduced manufacturing cost.

A description is now given of materials included in the toner (toner constituent liquid 10) of the present invention. First, the toner constituent liquid 10 described above in which toner constituents are dispersed and dissolved in a solvent is described in detail below.

Materials same as those used in the toner for the conventional electrophotography can be used in the toner of the present invention. For example, the toner of the present invention can be prepared as follows:

dissolving a binder resin such as a styrene-acrylic resin, a polyester resin, a polyol resin, and an epoxy resin, in an organic solvent;

dispersing a colorant therein;

dispersing or dissolving a release agent;

forming liquid droplets of the toner constituent liquid by the method-mentioned above; and drying the liquid droplets to form solid particles.

The toner constituent liquid can also be prepared by melt-kneading toner constituents, and then dissolving or dispersing the melt-kneaded mixture in an organic solvent.

(Toner)

The toner of the present invention comprises a resin and a colorant, and optionally includes a wax and so forth, if desired.

(Resin)

As the resin, a binder resin can be used.

Specific examples of the binder resins include, but are not limited to, vinyl homopolymers and copolymers of vinyl monomers (such as a styrene monomer, an acrylic monomer, and a methacrylic monomer), polyester resins, polyol resins, phenol resins, silicone resins, polyurethane resins, polyamide resins, furan resins, epoxy resins, xylene resins, terpene resins, coumarone-indene resins, polycarbonate resins, and petroleum resins.

Specific examples of the styrene monomers include, but are not limited to, styrenes such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene; and derivatives thereof.

Specific examples of the acrylic monomers include, but are not limited to, acrylic acids and esters thereof (i.e., acrylates) such as methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate.

Specific examples of the methacrylic monomers include, but are not limited to, methacrylic acids and esters thereof (i.e., methacrylates) such as methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate.

Specific examples of other vinyl monomers include, but are not limited to, the following compounds:

(1) monoolefins such as ethylene, propylene, butylene, and isobutylene;

(2) polyenes such as butadiene and isoprene;

(3) halogenated vinyl compounds such as vinyl chloride, vinylidene chloride, vinyl bromide, and vinyl fluoride;

(4) vinyl esters such as vinyl acetate, vinyl propionate, and vinyl benzoate;

(5) vinyl ethers such as vinyl methyl ether, vinyl ethyl ether, and vinyl isobutyl ether;

(6) vinyl ketones such as vinyl methyl ketone, vinyl hexyl ketone, and methyl isopropenyl ketone;

(7) N-vinyl compounds such as N-vinylpyrrole, N-vinylcarbazole, N-vinylindole, and N-vinylpyrrolidone;

(8) vinylnaphthalenes;

(9) derivatives of acrylic acid or methacrylic acid such as acrylonitrile, methacrylonitrile, and acrylamide;

(10) unsaturated dibasic acids such as maleic acid, citraconic acid, itaconic acid, alkenyl succinic acid, fumaric acid, and mesaconic acid;

(11) unsaturated dibasic acid anhydrides such as maleic acid anhydride, citraconic acid anhydride, itaconic acid anhydride, and alkenyl succinic acid anhydride;

(12) unsaturated dibasic acid monoesters such as monomethyl maleate, monoethyl maleate, monobutyl maleate, monomethyl citraconate, monoethyl citraconate, monobutyl citraconate, monomethyl itaconate, monomethyl alkenyl succinate, monomethyl fumarate, and monomethyl mesaconate;

(13) unsaturated dibasic acid esters such as dimethyl maleate and dimethyl fumarate;

(14) α,β-unsaturated acids such as crotonic acid and cinnamic acid;

(15) α,β-unsaturated acid anhydrides such as crotonic acid anhydride and cinnamic acid anhydride;

(16) anhydrides of α,β-unsaturated acids with lower fatty acids; anhydrides of alkenyl malonic acid, alkenyl glutaric acid, and alkenyl adipic acid; and monoester-like monomers thereof having a carboxyl group;

(17) hydroxyalkyl acrylates and methacrylates such as 2-hydroxyethyl acrylate, 2-hydroxyethyl methacrylate, and 2-hydroxypropyl methacrylate; and

(18) monomers having a hydroxyl group such as 4-(1-hydroxy-1-methylbutyl)styrene and 4-(1-hydroxy-1-methylhexyl)styrene.

The vinyl homopolymers and copolymers of the vinyl monomers may have a cross-linked structure formed using a cross-linking agent having 2 or more vinyl groups. Specific examples of the cross-linking agents having 2 or more vinyl groups include, but are not limited to, aromatic divinyl compounds such as divinylbenzene and divinylnaphthalene; diacrylate (or dimethacrylate) compounds in which acrylates (or methacrylates) are bound together with an alkyl chain (e.g., ethylene glycol diacrylate (or dimethacrylate), 1,3-butylene glycol diacrylate (or dimethacrylate), 1,4-butanediol diacrylate, 1,5-pentanediol diacrylate (or dimethacrylate), 1,6-hexanediol diacrylate (or dimethacrylate), neopentyl glycol diacrylate (or dimethacrylate)); diacrylate (or dimethacrylate) compounds in which acrylates (or methacrylates) are bound together with an alkyl chain having an ether bond (e.g., diethylene glycol diacrylate (or dimethacrylate), triethylene glycol diacrylate (or dimethacrylate), tetraethylene glycol diacrylate (or dimethacrylate), polyethylene glycol #400 diacrylate (or dimethacrylate), polyethylene glycol #600 diacrylate (or dimethacrylate), dipropylene glycol diacrylate (or dimethacrylate)); diacrylate (or dimethacrylate) compounds in which acrylates (or methacrylates) are bound together with a chain having an aromatic group and an ether bond; and polyester diacrylate compounds such as MANDA (from Nippon Kayaku Co., Ltd.)

Specific examples of polyfunctional cross-linking agents include, but are not limited to, pentaerythritol triacrylate, trimethylolethane triacrylate, trimethylolpropane triacrylate, tetramethylolmethane tetraacrylate, oligoester acrylate, pentaerythritol trimethacrylate, trimethylolethane trimethacrylate, trimethylolpropane trimethacrylate, tetramethylolmethane tetramethacrylate, oligoester methacrylate, triacyl cyanurate, and triallyl trimellitate.

The amount of the cross-linking agent is preferably from 0.01 to 10 parts by weight based on 100 parts by weight of the monomer, and more preferably from 0.03 to 5 parts by weight based on 100 parts by weight of the monomer. In view of imparting good fixability and hot offset resistance to the resultant toner, aromatic divinyl compounds (particularly divinylbenzene) and diacrylate compounds in which acrylates are bound together with a chain having an aromatic group and an ether bond are preferably used. Among the above monomers, combinations of monomers which can produce styrene copolymers or styrene-acrylic copolymers are preferably used.

Specific examples of polymerization initiator used for the polymerization of vinyl polymers and copolymers include, but are not limited to, 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobis isobutyrate, 1,1'-azobis(1-cyclohexanecarbonitrile), 2-(carbamoylazo)-isobutyronitrile, 2,2'-azobis(2,4,4-trimethylpentane), 2-phenylazo-2',4'-dimethyl-4'-methoxyvaleronitrile, 2,2'-azobis(2-methylpropane), ketone peroxides (e.g., methyl ethyl ketone peroxide, acetylacetone peroxide, cyclohexanone peroxide), 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, di-cumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, diethoxyisopropylperoxy dicarbonate, di(3-methyl-3-methoxybutyl)peroxy carbonate, acetylcyclohexylsulfonyl peroxide, tert-butylperoxy acetate, ter-butyloxy isobutylate, tert-butylperoxy-2-ethylhexanoate, tert-butylperoxy laurate, tert-butyloxy benzoate, tert-butylperoxy isopropyl carbonate, di-tert-butylperoxy isophthalate, tert-butylperoxy allyl carbonate, isoamylperoxy-2-ethylhexanoate, di-tert-butylperoxy hexahydroterephthalate, and tert-butylperoxy azelate.

When the binder resin is a styrene-acrylic resin, THF-soluble components of the styrene-acrylic resin preferably has a molecular weight distribution such that at least one peak is present in each of a number average molecular weight range of from 3,000 to 50,000 and that of not less than 100,000, determined by GPC. In this case, the resultant toner has good fixability, offset resistance, and preservability. A binder resin including THF-soluble components having a molecular weight of not greater than 100,000 in an amount of from 50 to 90% is preferably used. A binder resin having a molecular weight distribution such that a main peak is present in a molecular weight range of from 5,000 to 30,000 is more preferably used. A binder resin having a molecular weight distribution such that a main peak is present in a molecular weight range of from 5,000 to 20,000 is much more preferably used.

When the binder resin is a vinyl polymer such as a styrene-acrylic resin, the resin preferably has an acid value of from 0.1 to 100 mgKOH/g, more preferably from 0.1 to 70 mgKOH/g, and much more preferably from 0.1 to 50 mgKOH/g.

Specific examples of alcohol monomers for preparing the polyester resin include, but are not limited to, diols such as ethylene glycol, propylene glycol, 1,3-bitanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A and bisphenol A to which a cyclic ether such as ethylene oxide and propylene oxide is polymerized. In order that the polyester resin has a cross-linked structure, polyols having 3 or more valences are preferably used.

Specific examples of the polyols having 3 or more valences include, but are not limited to, sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethylolethane, trimethylolpropane, and 1,3,5-trihydroxybenzene.

Specific examples of acid monomers for preparing the polyester resin include, but are not limited to, benzene dicarboxylic acids (e.g., phthalic acid, isophthalic acid, terephthalic acid) and anhydrides thereof; alkyl dicarboxylic acids (e.g., succinic acid, adipic acid, sebacic acid, azelaic acid) and anhydrides thereof; unsaturated dibasic acids (e.g., maleic acid, citraconic acid, itaconic acid, alkenylsuccinic acid, fumaric acid, mesaconic acid); and unsaturated dibasic acid anhydrides (e.g., maleic acid anhydride, citraconic acid anhydride, itaconic acid anhydride, alkenylsuccinic acid anhydride). Polycarboxylic acids having 3 or more valences can also be used. Specific examples of the polycarboxylic acids having 3 or more valences include, but are not limited to, trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, tetra (methylenecarboxyl)methane, 1,2,7,8-octanetetracarboxylic acid, and anhydrides and partial lower alkyl esters thereof.

When the binder resin is a polyester resin, the THF-soluble components of the polyester resin preferably have a molecular weight distribution such that at least one peak is present in a number average molecular weight range of from 3,000 to 50,000, determined by GPC. In this case, the resultant toner has good fixability and offset resistance. A binder resin including THF-soluble components having a molecular weight of not greater than 100,000 in an amount of from 60 to 100% is preferably used. A binder resin having a molecular weight distribution such that at least one peak is present in a molecular weight range of from 5,000 to 20,000 is more preferably used.

When the binder resin is a polyester resin, the resin preferably has an acid value of from 0.1 to 100 mgKOH/g, more preferably from 0.1 to 70 mgKOH/g, and much more preferably from 0.1 to 50 mgKOH/g.

In the present invention, a molecular weight distribution of the binder resin is measured by gel permeation chromatography (GPC) in which THF is used as a solvent.

The vinyl polymer and/or polyester resin used for the present invention may include a monomer unit capable of reacting with both the vinyl polymer and the polyester resin. Specific examples of the monomers for preparing the polyester resin and capable of reacting with the vinyl polymer include, but are not limited to, unsaturated dicarboxylic acids (e.g., phthalic acid, maleic acid, citraconic acid, itaconic acid) and anhydrides thereof. Specific examples of the monomers for preparing the vinyl polymer and capable of reacting with the polyester resin include, but are not limited to, monomers having carboxyl group or hydroxy group, acrylates, and methacrylates.

When the binder resin includes the polyester resin and the vinyl polymer in combination with another resin, the binder resin preferably includes resins having an acid value of from 0.1 to 50 mgKOH/g in an amount of not less than 60%.

In the present invention, the acid value of a binder resin of a toner is determined by the following method according to JIS K-0070.

In order to prepare a sample, toner components except the binder resin are previously removed from the toner. Alternatively, if the toner is directly used as a sample, the acid value and weight of the toner components except the binder resin (such as a colorant and a magnetic material) are previously measured, and then the acid value of the binder resin is calculated.

(1) 0.5 to 2.0 g of a pulverized sample is precisely weighed;
(2) the sample is dissolved in 150 ml of a mixture of toluene and ethanol, mixing at a volume ratio of 4/1, in a 300 ml beaker;
(3) the mixture prepared above and the blank each are titrated with a 0.1 mol/l ethanol solution of KOH using a potentiometric titrator; and
(4) the acid value of the sample is calculated from the following equation:

$$AV=[(S-B)\times f\times 5.61]/W$$

wherein AV (mgKOH/g) represents an acid value, S (ml) represents the amount of the ethanol solution of KOH used for the titration of the sample, B (ml) represents the amount of the ethanol solution of KOH used for the titration of the blank, f represents the factor of KOH, and W (g) represents the weight of the binder resin included in the sample.

Each of the binder resin and the toner including the binder resin preferably has a glass transition temperature (Tg) of from 35 to 80° C., and more preferably from 40 to 75° C., from the viewpoint of enhancing preservability of the toner. When the Tg is too small, the toner tends to deteriorate under high temperature atmosphere and cause offset when fixed. When the Tg is too large, fixability of the toner deteriorates.

(Magnetic Material)

As the magnetic materials for use in the toner of the present invention, the following compounds can be used: (1) magnetic iron oxides (e.g., magnetite, maghemite, ferrite) and iron oxides including other metal oxides; (2) metals (e.g., iron, cobalt, nickel) and metal alloys of the above metals with aluminum, cobalt, copper, lead, magnesium, tin, zinc, antimony, beryllium, bismuth, cadmium, calcium, manganese, selenium, titanium, tungsten, vanadium, etc.; and (3) mixtures thereof.

Specific examples of the magnetic materials include, but are not limited to, $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. These can be used alone or in combination. Among these, powders of $Fe_3O_4$ and $\gamma$-$Fe_2O_3$ are preferably used.

In addition, magnetic iron oxides (e.g., magnetite, maghemite, ferrite) containing a dissimilar element and mixtures thereof can also be used. Specific examples of the dissimilar elements include, but are not limited to, lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, and gallium. Among these, magnesium, aluminum, silicon, phosphorus, and zirconium are preferably used. The dissimilar element may be incorporated into the crystal lattice of an iron oxide; the oxide thereof may be incorporated into an iron oxide; or the oxide or hydroxide thereof may be present at the surface of an iron oxide. However, it is preferable that the oxide of the dissimilar element is incorporated into an iron oxide.

The dissimilar element is incorporated into a magnetic iron oxide by mixing a salt of the dissimilar element and the magnetic iron oxide and controlling the pH. The dissimilar element is deposited out on the surface of a magnetic iron oxide by adding a salt of the dissimilar element and controlling the pH. The toner preferably includes the magnetic material in an amount of from 10 to 200 parts by weight, and more preferably from 20 to 150 parts by weight, based on 100 parts by weight of the binder resin. The magnetic material preferably has a number average particle diameter of from 0.1 to 2 μm, and more preferably from 0.1 to 0.5 μm. The number average particle diameter can be determined from a magnified photographic image obtained by a transmission electron microscope using a digitizer.

The magnetic material preferably has a coercive force of from 20 to 150 oersted, a saturation magnetization of from 50 to 200 emu/g, and a residual magnetization of from 2 to 20 emu/g, when 10K oersted of magnetic field is applied.

The magnetic material can also be used as a colorant.

(Colorant)

Specific examples of the colorants for use in the toner of the present invention include, but are not limited to, any known dyes and pigments such as carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, etc. These materials can be used alone or in combination.

The toner preferably includes a colorant in an amount of from 1 to 15% by weight, and more preferably from 3 to 10% by weight.

The colorant for use in the present invention can be combined with a resin to be used as a master batch. Specific examples of the resin for use in the master batch include, but are not limited to, the above-mentioned polyester-based resins, styrene polymers and substituted styrene polymers (e.g., polystyrenes, poly-p-chlorostyrenes, polyvinyltoluenes), styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloro methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic acid ester copolymers), polymethyl methacrylates, polybutyl methacrylates, polyvinyl chlorides, polyvinyl acetates, polyethylenes, polypropylenes, polyesters, epoxy resins, epoxy polyol resins, polyurethanes, polyamides, polyvinyl butyrals, polyacrylic acids, rosins, modified rosins, terpene resins, aliphatic or alicyclic hydrocarbon resins, aromatic petroleum resins, chlorinated paraffins, paraffin waxes, etc. These resins can be used alone or in combination.

The master batches can be prepared by mixing one or more of the resins as mentioned above and the colorant as mentioned above and kneading the mixture while applying a high shearing force thereto. In this case, an organic solvent can be added to increase the interaction between the colorant and the resin. In addition, a flushing method in which an aqueous paste including a colorant and water is mixed with a resin dissolved in an organic solvent and kneaded so that the colorant is transferred to the resin side (i.e., the oil phase), and then the organic solvent (and water, if desired) is removed, can be preferably used because the resultant wet cake can be used as it is without being dried. When performing the mixing and kneading process, dispersing devices capable of applying a high shearing force such as three roll mills can be preferably used.

The toner preferably includes the master batch in an amount of from 0.1 to 20 parts by weight based on 100 parts by weight of the binder resin.

The resin used for the master batch preferably has an acid value of not greater than 30 mgKOH/g and an amine value of from 1 to 100, and more preferably an acid value of not greater than 20 mgKOH/g and an amine value of from 10 to 50. When the acid value is too large, chargeability of the toner deteriorates under high humidity conditions and dispersibility of the colorant deteriorates. When the amine value is too small or large, dispersibility of the colorant deteriorates. The acid value and the amine value can be measured according to JIS K-0070 and JIS K-7237, respectively.

A colorant dispersing agent can be used in combination with the colorant. The colorant dispersing agent preferably has high compatibility with the binder resin in order to well disperse the colorant. Specific examples of useable commercially available colorant dispersing agents include, but are not limited to, AJISPER® PB-821 and PB-822 (from Ajinomoto-Fine-Techno Co., Inc.), DISPERBYK®-2001 (from BYK-Chemie Gmbh), and EFKA® 4010 (from EFKA Additives BV).

The colorant dispersing agent preferably has a weight average molecular weight, which is a local maximum value of the main peak observed in the molecular weight distribution measured by GPC (gel permeation chromatography) and converted from the molecular weight of styrene, of from 500 to 100,000, more preferably from 3,000 from 100,000, from the viewpoint of enhancing dispersibility of the colorant. In particular, the average molecular weight is preferably from 5,000 to 50,000, and more preferably from 5,000 to 30,000. When the average molecular weight is too small, the dispersing agent has too high a polarity, and therefore dispersibility of the colorant deteriorates. When the average molecular weight is too large, the dispersing agent has too high an affinity for the solvent, and therefore dispersibility of the colorant deteriorates.

The toner preferably includes the colorant dispersing agent in an amount of from 1 to 200 parts by weight, and more preferably from 5 to 80 parts by weight, based on 100 parts by weight of the colorant. When the amount is too small, the colorant cannot be well dispersed. When the amount is too large, chargeability of the resultant toner deteriorates.

(Carrier)

The toner of the present invention can be mixed with a carrier so as to be used for a two-component developer. As the carrier, typical ferrite, magnetite, and a carrier covered with a resin (hereinafter referred to as resin-covered carrier) can be used.

The resin-covered carrier comprises a core and a covering material (i.e., resin) which covers the surface of the core.

Specific examples of the resins used for the covering material include, but are not limited to, styrene-acrylic resins (e.g., styrene-acrylate ester copolymer, styrene-methacrylate ester copolymer), acrylic resins (e.g., acrylate ester copolymer, methacrylate ester copolymer), fluorocarbon resins (e.g., polytetrafluoroethylene, monochlorotrifluoroethylene polymer, polyvinylidene fluoride), silicone resin, polyester resin, polyamide resin, polyvinyl butyral, aminoacrylate resin, ionomer resin, and polyphenylene sulfide resin. These can be used alone or in combination. A core in which a magnetic powder is dispersed in a resin can also be used.

Specific examples of methods for covering the surface of a core with a covering material (i.e., resin) include, but are not limited to, a method in which a solution or suspension of the resin is coated on the core, and a method in which the powder resin is mixed with the resin.

The resin-covered carrier preferably includes the covering material in an amount of from 0.01 to 5% by weight, and more preferably from 0.1 to 1% by weight.

As a covering material, mixtures of two or more compounds can also be used. For example, (1) 100 parts by weight of a titanium oxides treated with 12 parts by weight of a mixture of dimethyldichlorosilane and dimethyl silicone oil (mixing weight ratio is 1/5) and (2) 100 parts by weight of a silica treated with 20 parts by weight of a mixture of dimethyldichlorosilane and dimethyl silicone oil (mixing weight ratio is 1/5) can be used.

Among the above-mentioned resins, styrene-methyl methacrylate copolymer, mixtures of a fluorocarbon resin and a styrene copolymer, and silicone resin are preferably used, and silicone resin are more preferably used.

Specific examples of the mixtures of a fluorocarbon resin and a styrene copolymer include, but are not limited to, a mixture of polyvinylidene fluoride and styrene/methyl methacrylate copolymer; a mixture of polytetrafluoroethylene and styrene/methyl methacrylate copolymer; and a mixture of vinylidene fluoride/tetrafluoroethylene copolymer (copolymerization ratio is from 10:90 to 90:10 by weight), styrene/2-ethylhexyl acrylate copolymer (copolymerization ratio is from 10:90 to 90:10 by weight), and styrene/2-ethylhexyl acrylate/methyl methacrylate copolymer (copolymerization ratio is (20 to 60):(5 to 30):(10 to 50) by weight).

Specific examples of the silicone resins include, but are not limited to, a silicone resin containing nitrogen and a modified silicone resin formed by reacting a silane-coupling agent containing nitrogen with a silicone resin.

Magnetic materials used for the core include, but are not limited to, oxides such as ferrite, iron excess ferrite, magnetite, and γ-iron oxide; metals such as iron, cobalt, an nickel and alloys thereof.

Specific examples of the elements included in these magnetic materials include, but are not limited to, iron, cobalt, nickel, aluminum, copper, lead, magnesium, tin, zinc, antimony, beryllium, bismuth, calcium, manganese, selenium, titanium, tungsten, and vanadium. Among these, Cu—Zn—Fe ferrites including copper, zinc, and iron as main components and Mn—Mg—Fe ferrites including manganese, magnesium, and iron as main components are preferably used.

The carrier preferably has a resistivity of from $10^6$ to $10^{10}$ Ω·cm by controlling the roughness of the surface and the amount of the covering resin.

The carrier typically has a particle diameter of from 4 to 200 µm, preferably from 10 to 150 µm, and more preferably from 20 to 100 µm. The resin-covered carrier preferably has a 50% particle diameter of from 20 to 70 µm.

The two-component developer preferably includes the toner of the present invention in an amount of from 1 to 200 parts by weight, and more preferably from 2 to 50 parts by weight, based on 100 parts by weight of the carrier.

(Wax)

The toner of the present invention may include a wax together with a binder resin and a colorant.

Any known waxes can be used for the toner of the present invention. Specific examples of the waxes include, but are not limited to, aliphatic hydrocarbon waxes (e.g., low-molecular-weight polyethylene, low-molecular-weight polypropylene, polyolefin wax, microcrystalline wax, paraffin wax, SASOL wax), oxides of aliphatic hydrocarbon waxes (e.g., polyethylene oxide wax) and copolymers thereof, plant waxes (e.g., candelilla wax, carnauba wax, haze wax, jojoba wax), animal waxes (e.g., bees wax, lanoline, spermaceti wax), mineral waxes (e.g., ozokerite, ceresin, petrolatum), waxes including fatty acid esters (e.g., montanic acid ester wax, castor wax) as a main component, and partially or completely deacidified fatty acid esters (e.g., deacidified carnauba wax).

In addition, the following compounds can also be used: saturated straight-chain fatty acids (e.g., palmitic acid, stearic acid, montanic acid, and other straight-chain alkyl carboxylic acid), unsaturated fatty acids (e.g., brassidic acid, eleostearic acid, parinaric acid), saturated alcohols (e.g., stearyl alcohol, eicosyl alcohol, behenyl alcohol, carnaubyl alcohol, ceryl alcohol, melissyl alcohol, and other long-chain alkyl alcohol), polyols (e.g., sorbitol), fatty acid amides (e.g., linoleic acid amide, olefin acid amide, lauric acid amide), saturated fatty acid bisamides (e.g., methylenebis capric acid amide, ethylenebis lauric acid amide, hexamethylenebis stearic acid amide), unsaturated fatty acid amides (e.g., ethylenebis oleic acid amide, hexamethylenebis oleic acid amide, N,N'-dioleyl adipic acid amide, N,N'-dioleyl sebacic acid amide), aromatic biamides (e.g., m-xylenebis stearic acid amide, N,N-distearyl isophthalic acid amide), metal salts of fatty acids (e.g., calcium stearate, calcium laurate, zinc stearate, magnesium stearate), alophatic hydrocarbon waxes to which a vinyl monomer such as styrene and an acrylic acid is grafted, partial ester compounds between a fatty acid such as behenic acid monoglyceride and a polyol, and methyl ester compounds having a hydroxyl group obtained by hydrogenating plant fats.

In particular, the following compounds are preferably used: a polyolefin obtained by radical polymerizing an olefin under high pressure; a polyolefin obtained by purifying low-molecular-weight by-products of a polymerization reaction of a high-molecular-weight polyolefin; a polyolefin polymerized under low pressure in the presence of a Ziegler catalyst or a metallocene catalyst; a polyolefin polymerized using radiation, electromagnetic wave, or light; a low-molecular-weight polyolefin obtained by thermally decomposing a high-molecular-weight polyolefin; paraffin wax; microcrystalline wax; Fischer-Tropsch wax; hydrocarbon waxes synthesized with Synthol method, Hydrocoal method, Arge method, and so forth; synthesized waxes including a compound having one carbon atom as a monomer unit; hydrocarbon waxes having a functional group such as hydroxyl group and carboxyl group; mixtures of a hydrocarbon wax and that having a functional group; and these waxes to which a vinyl monomer such as styrene, a maleate, an acrylate, a methacrylate, and a maleic anhydride is grafted.

In addition, these waxes subjected to a press sweating method, a solvent method, a recrystallization method, a vacuum distillation method, a supercritical gas extraction method, or a solution crystallization method, so as to much more narrow the molecular weight distribution thereof are preferably used. Further, low-molecular-weight solid fatty acids, low-molecular-weight solid alcohols, low-molecular-weight solid compounds, and other compounds from which impurities are removed are preferably used.

The wax preferably has a melting point of from 70 to 140° C., and more preferably from 70 to 120° C., so that the resultant toner has a good balance of toner blocking resistance and offset resistance. When the melting point is too small, toner blocking resistance deteriorates. When the melting point is too large, offset resistance deteriorates.

When two or more waxes are used in combination, functions of both plasticizing and releasing simultaneously appear.

As a wax having a function of plasticizing, for example, a wax having a low melting point, a wax having a branched structure, and a wax having a polar group can be used.

As a wax having a function of releasing, for example, a wax having a high melting point, a wax having a straight-chain structure, and a nonpolar wax having no functional group can be used. For example, a combination of two waxes having the difference in melting point of from 10 to 100° C., and a combination of a polyolefin and a grafted polyolefin are preferable.

When two waxes having a similar structure are used in combination, a wax having relatively lower melting point exerts a function of plasticizing and the other wax having a relatively higher lower melting point exerts a function of releasing. When the difference in melting point between the two waxes is from 10 to 100° C., these functions are efficiently separately expressed. When the difference is too small, these functions are not efficiently separately expressed. When the difference is too large, each of the functions is hardly enhanced by their interaction. It is preferable that one wax has a melting point of from 70 to 120° C., more preferably from 70 to 100° C.

As mentioned above, a wax having a branched structure, a wax having a polar group such as a functional group, and a wax modified with a component different from the main component of the wax relatively exerts a function of plasticizing. On the other hand, a wax having a straight-chain structure, a nonpolar wax having no functional group, and an unmodified wax relatively exerts a function of releasing. Specific preferred examples of combinations of waxes include, but are not limited to, a combination of a polyethylene homopolymer or copolymer including ethylene as a main component, and a polyolefin homopolymer or copolymer including an olefin other than ethylene as a main component; a combination of a polyolefin and a graft-modified polyolefin; a combination of a hydrocarbon wax and one member selected from an alcohol wax, a fatty acid wax, and an ester wax, and; a combination of a Fischer-Tropsch wax or a polyolefin wax, and a paraffin wax or a microcrystalline wax; a combination of a Fischer-Tropsch wax and a polyolefin wax; a combination of a paraffin wax and a microcrystalline wax; and a combination of a hydrocarbon wax and one member selected from a carnauba wax, a candelilla wax, a rice wax, and a montan wax.

The toner preferably has a maximum endothermic peak in a temperature range of from 70 to 110° C. of the endothermic curve measured by DSC (differential scanning calorimetry). In this case, the toner has a good balance of preservability and fixability.

The toner preferably includes the wax in an amount of from 0.2 to 20 parts by weight, more preferably from 0.5 to 10 parts by weight, based on 100 parts by weight of the binder resin.

In the present invention, the melting point of a wax is defined as a temperature in which the maximum endothermic peak is observed in an endothermic curve measured by DSC.

As a DSC measurement instrument, a high-precision inner-heat power-compensation differential scanning calorimeter is preferably used. The measurement is performed according to ASTM D3418-82. The endothermic curve is obtained by heating a sample at a temperature increasing rate of 10° C./min, after once heated and cooled the sample.

(Fluidity Improving Agent)

The toner of the present invention may include a fluidity improving agent, which enables the resultant toner to easily fluidize by being added to the surface of the toner.

Specific examples of the fluidity improving agents include, but are not limited to, carbon black, fine powders of fluorocarbon resins such as vinylidene fluoride and polytetrafluoroethylene; fine powders of silica prepared by a wet process or a dry process, titanium oxide, and alumina; and these silica, titanium oxide, and alumina surface-treated with a silane-coupling agent, a titanium-coupling agent, or a silicone oil. Among these, fine powders of silica, titanium oxide, and alumina are preferably used, and the silica surface-treated with a silane-coupling agent or a silicone oil is more preferably used.

The fluidity improving agent preferably has an average primary particle diameter of from 0.001 to 2 μm, and more preferably from 0.002 to 0.2 μm.

A fine powder of silica is prepared by a vapor phase oxidization of a halogenated silicon compound, and typically called a dry process silica or a fumed silica.

Specific examples of useable commercially available fine powders of silica prepared by a vapor phase oxidization of a halogenated silicon compound include, but are not limited to, AEROSIL® 130, 300, 380, TT600, MOX170, MOX80, and COK84 (from Nippon Aerosil Co., Ltd.), CAB-O-SIL® M-5, MS-7, MS-75, HS-5, and EH-5 (from Cabot Corporation), WACKER HDK® N20, V15, N20E, T30, and T40 (from Wacker Chemie Gmbh), Dow Corning® Fine Silica (from Dow Corning Corporation), and FRANSIL (from Fransol Co.).

A hydrophobized fine powder of silica prepared by a vapor phase oxidization of a halogenated silicon compound is more preferably used. The hydrophobized silica preferably has a hydrophobized degree of from 30 to 80%, measured by a methanol titration test. The hydrophobic property is imparted to a silica when an organic silicon compound is reacted with or physically adhered to the silica. A hydrophobizing method in which a fine powder of silica prepared by a vapor phase oxidization of a halogenated silicon compound is treated with an organic silicon compound is preferable.

Specific examples of the organic silicon compounds include, but are not limited to, hydroxypropyltrimethoxysilane, phenyltrimethoxysilane, n-hexadecyltrimethoxysilane, n-octadecyltrimethoxysilane, vinyltrimethoxysilane, vinyltriethoxysilane, vinyltriacetoxysilane, dimethylvinylchlorosilane, divinylchlorosilane, γ-methacryloxypropyltrimethoxysilane, hexamethyldisilazane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units per molecule and 0 to 1 hydroxyl group bound to Si in the end siloxane units, and silicone oils such as dimethyl silicone oil. These can be used alone or in combination.

The fluidity improving agent preferably has a number average particle diameter of from 5 to 100 nm, and more preferably from 5 to 50 nm.

The fluidity improving agent preferably has a specific surface area of not less than 30 m$^2$/g, and more preferably from 60 to 400 m$^2$/g, measured by nitrogen adsorption BET method. The surface-treated fluidity improving agent preferably has a specific surface area of not less than 20 m$^2$/g, and more preferably from 40 to 300 m$^2$/g, measured by nitrogen adsorption BET method.

The toner preferably includes the fluidity improving agent in an amount of from 0.03 to 8 parts by weight based on 100 parts by weight of the toner.

Other additives can be suitably added to the toner of the present invention if desired, aiming at protecting electrostatic latent image bearing member and carrier, improving cleaning ability, controlling thermal property, electric property, and physical property, controlling resistance property, controlling softening point, and improving fixing rate. Examples of the other additives include, but are not limited to, various metal soaps; fluorine surfactants; dioctyl phthalate; conductivity imparting agents such as tin oxides, zinc oxides, carbon black, and antimony oxides; and inorganic fine powders such as titanium oxides, aluminum oxides, and aluminas. Each of the above-described inorganic fine powders may be hydrophobized in accordance with the necessity. In addition, it is possible to use a small amount of lubricants such as polytetrafluoroethylene, zinc stearate, and polyfluorovinylidene; abrasives such as cesium oxides, silicon carbides, and strontium titanate; and caking protecting agents. Moreover, white fine particles and black fine particles having a polarity opposite to that of the toner particles can be further added as a developing property improving agent. It is also preferable that each of the above-described additives is treated with treatment agents such as silicone varnish, various types of modified-silicone varnish, silicone oil, various types of silicone oil, silane coupling agent, silane coupling agent having a functional group, and other organic silicon compounds or other types of treatment agents, aiming at controlling the charge amount of the toner.

In the course of preparation of a developer, inorganic fine particles such as the above-described hydrophobized silica fine powders may be mixed and added to enhance fluidity, storage stability, developing property, and transferability of the resultant developer. As for the mixing of external additives, a generally used mixer for powder can be used. In particular, a mixer equipped with a jacket or the like capable of controlling the inner temperature thereof is preferable. In order to change history of load to be applied to the external additives, the external additives may be added in the course of mixing or by degrees. Of course, rotation speed of a mixer, rolling speed, mixing time, temperature, or the like may be altered. A heavy load may be given first, and then a relatively light load may be given to the mixer or may be conversely.

Specific examples of usable mixing equipment include, but are not limited to, a V-form mixer, a locking mixer, a Loedge mixer, a NAUTER MIXER, and a HENSCHEL MIXER.

The method for controlling a shape of the obtained toner is not particularly limited, and may be suitably selected in accordance with the intended use. Specific examples of such a method include, but are not limited to, a method in which a mixture of toner constituents including a binder resin and a colorant are melt-kneaded and finely pulverized, and the pulverized mixture is mechanically controlled to have a spherical shape using HYBRIDIZER and MECHANOFUSION; a so-called spray dry method in which toner constituents are dissolved or dispersed in a solvent in which a binder resin is soluble, and the solution or the dispersion is subjected to a solvent removal treatment using a spray drying device to obtain a spherical toner; and a method in which toner constituents are heated in an aqueous medium to obtain a spherical toner.

Inorganic fine particles are preferably used as the external additives.

Specific examples of the inorganic fine particles include, but are not limited to, silica, alumina, titanium oxide, barium titanate, magnesium titanate, calcium titanate, strontium titanate, zinc oxide, tin oxide, silica sand, clay, mica, sandlime, diatom earth, chromium oxide, cerium oxide, colcothar, antimony trioxide, magnesium oxide, zirconium oxide, barium sulfate, barium carbonate, calcium carbonate, silicon carbide, and silicon nitride.

The inorganic fine particles preferably have a primary particle diameter of from 5 to 2 μm, and more preferably from 5 to 500 μm.

The inorganic fine particles preferably have a specific surface area of from 20 to 500 m$^2$/g, based on the BET method.

The toner preferably includes the inorganic fine particles in an amount of from 0.01 to 5% by weight, and more preferably from 0.01 to 2.0% by weight.

Specific examples of the external additives further include, but are not limited to, fine particles of polymers such as polystyrenes obtained by soap-free emulsion polymerization, suspension polymerization, and dispersion polymerization; copolymers of methacrylic acid ester and acrylic acid ester; and polycondensed polymers such as silicone, benzoguanamine, and nylon; and thermosetting resins.

The above-described external additives can be hydrophobized using a surface treatment agent so as not to deteriorate even under high humidity conditions.

Specific preferred examples of the surface treatment agent include, but are not limited to, a silane coupling agent, a sililation reagent, a silane coupling agent having a fluorinated alkyl group, an organic titanate coupling agent, an aluminum coupling agent, a silicone oil, and a modified silicone oil.

The inorganic fine particles preferably have a primary particle diameter of from 5 to 2 μm, and more preferably from 5 to 500 μm. The inorganic fine particles preferably have a specific surface area of from 20 to 500 m$^2$/g, based on the BET method. The toner preferably includes the inorganic fine particles in an amount of from 0.01 to 5% by weight, and more preferably from 0.01 to 2.0% by weight.

Specific examples of cleaning ability improving agents for removing toner particles remaining on an electrostatic latent image bearing member or a primary transferring medium after transferring include, but are not limited to, a fatty acid metal slat such as zinc stearate and calcium stearate; and fine particles of polymers such as polymethyl methacrylate and polystyrene, produced by a soap-free emulsion polymerization method. Fine particles of polymer preferably have a relatively narrow particle size distribution and a weight average particle diameter of from 0.01 to 1 μm.

In a developing method in which the toner of the present invention is used, an electrostatic latent image bearing member used in conventional electrophotography can be used. For example, an organic electrostatic latent image bearing member, an amorphous silica electrostatic latent image bearing member, a selenium electrostatic latent image bearing member, and a zinc oxide electrostatic latent image bearing member can be suitably used.

A description is now given of the toner constituent liquid used for forming the toner particles by cooling and solidifying the liquid droplets of the toner constituent liquid.

When the toner particles are formed by heating and melting toner constituents, and cooling and solidifying liquid droplets of the melted toner constituents, the toner constituents preferably include materials having a low melt viscosity when melted as a main component.

Specific examples of the materials having a low melt viscosity when melted include, but are not limited to, monoamide, bisamide, tetramide, polyamide, ester amide, polyester, polyvinyl acetate, acrylic and methacrylic acid based polymer, styrene polymer, ethylene-vinyl acetate copolymer, polyketone, silicone, coumarone, aliphatic acids, aliphatic acid amide, N-substituted aliphatic acid amide, aliphatic acid ester, triglyceride, a natural resin, and a natural and synthetic wax. These materials can be used alone or in combination.

Specific examples of the polyamide include, but are not limited to, VERSAMID 711, VERSAMID 725, VERSAMID 930, VERSAMID 940, VERSALON 1117, VERSALON 1138 and VERSALON 1300 (all from Henkel Japan Ltd.), as well as TOHMIDE 391, TOHMIDE 393, TOHMIDE 394, TOHMIDE 395, TOHMIDE 397, TOHMIDE 509, TOHMIDE 535, TOHMIDE 558, TOHMIDE 560, TOHMIDE 1310, TOHMIDE 1396, TOHMIDE 90 and TOHMIDE 92 (all from Fuji Kasei Kogyo Co. Ltd.). Specific examples of the polyester include, but are not limited to, KTR2150 (from Kao Corporation); specific examples of the polyvinyl acetate include, but are not limited to, AC401, AC540 and AC580 (from Allied Chemical Corporation); specific examples of the silicone include, but are not limited to, SH6018 (from Dow Corning Toray Co., Ltd.), KR215, KR216 and KR220 (from Shin-Etsu Chemical Co., Ltd.); and specific examples of the cumarone include, but are not limited to, ESCRON G-90 (from Nitto Chemical, Ltd.).

Specific examples of the aliphatic acids include, but are not limited to, acids such as stearic acids, arachic acids, behenic acids, lignoceric acids, cerotic acids, montanic acids, and melissic acids, as well as esters thereof, which may be used either alone or in combination.

Specific example of the aliphatic acid amide include, but are not limited to, lauric acid amide, stearic acid amide, oleic acid amide, erucic acid amide, ricinoleic acid amide, stearic acid ester amide, palmitic acid amide, behenic acid amide and brascidic acid, which may be used either alone or in combination. Specific examples of the N-substituted aliphatic acid amide include, but are not limited to, N,N'-2-hydroxystearic acid amide, N,N'-ethylenebisoleic acid amide, N,N'-xylenebisstearic acid amide, stearic acid monomethylol amide, N-oleylstearic acid amide, N-stearylstearic acid amide, N-oleylpalmitic acid amide, N-stearylerucic acid amide, N,N'-dioleyladipic acid amide, N,N'-dioleylsebacic acid amide, N,N'-distearylisophthalic acid amide, and 2-stearamide ethyl stearate, which may be used either alone or in combination.

Specific examples of the aliphatic acid ester include, but are not limited to, aliphatic acid esters of mono- or polyhydric alcohols, such as sorbitan monopalmitate, sorbitan monostearate, sorbitan monobehenate, polyethylene glycol monostearate, polyethylene glycol distearate, propylene glycol monostearate, and ethylene glycol distearate.

Specific examples of commercially available aliphatic acid esters include, but are not limited to, RHEODOL SP-S10, RHEODOL SP-S30, RHEODOL SA10, EMASOL P-10, EMASOL S-10, EMASOL S-20, EMASOL B, RHEODOL SUPER SP-S10, EMANON 3199, EMANON 3299, and EXCEPARL PE-MS (from Kao Corporation).

Aliphatic acid esters of glycerin such as stearic acid monoglyceride, palmitic acid monoglyceride, oleic acid monoglyceride, and behenic acid monoglyceride are much more preferably used. Specific examples of commercially available aliphatic acid esters of glycerin include, but are not limited to, RHEODOL MS-50, RHEODOL MS-60, RHEODOL MS-165, RHEODOL MO-60, and EXCEPARL G-MB (from Kao Corporation), deodorized and purified carnauba wax No. 1 and purified candelilla wax No. 1 (both from Cerarica Noda Co., Ltd.), SYNCROWAX ERL-C and SYNCROWAX HR-C (from Croda Japan KK), and KF2 (from Kawaken Fine Chemicals Co., Ltd.). A special ester-based wax may also be used. Specific examples of the special ester based wax include, but are not limited to, EXCEPARL DS-C2 (from Kao Corporation), as well as KAWASLIP-L and KAWASLIP-R (from Kawaken Fine Chemicals Co., Ltd.). In addition, higher alcohol esters of higher aliphatic acids may be used. Specific examples of the higher alcohol esters of higher aliphatic acids include, but are not limited to, myricyl cerotate, ceryl cerotate, ceryl montanate, myricyl palmitate, myricyl stearate, cetyl palmitate, and cetyl stearate.

Both the aliphatic acids and alcohols include an alkyl group. The above-described examples of aliphatic acid ester may be used alone or in combination. The aliphatic acid ester has a low melt viscosity and provides stable fluidity when the toner is melted. Since ester bonds are more deformable than carbon-carbon bonds, the resultant toner provides a stronger surface protective force of the resultant image so that the resultant image can reasonably withstand repeated bending thereof. Preferred aliphatic acid ester has a penetration index greater than 1 and is easily processed under pressure. An aliphatic acid ester having a viscosity less than 20 mPa·s when being injected is more suitably used.

Polyamides are generally classified into two main groups, aromatic polyamides and dimer acid based polyamides. Dimer acid based polyamides are preferably used for the present invention. The dimer acid is preferably prepared from oleic acid, linolic acid, linoleic acid, or eleostearic acid. Specific examples of dimmer acid based polyamide include, but are not limited to, MACROMELT® 6030, MACROMELT® 6065, MACROMELT® 6071, MACROMELT® 6212, MACROMELT® 6217, MACROMELT® 6224, MACROMELT® 6228, MACROMELT® 238, MACROMELT® 6239, MACROMELT® 6240, MACROMELT® 6301, MACROMELT® 6900, DPX 335-10, DPX H-415, DPX 335-11, DPX 830, DPX 850, DPX 925, DPX 927, DPX 1160, DPX 1163, DPX 1175, DPX 1196, and DPX 1358 (from Henkel Japan Ltd.), and SYLVAMIDE-5, UNI-REZ® 2224, and UNI-REZ® 2970 (from Arizona Chemical Company).

Specific examples of the glyceride include, but are not limited to, rosin ester, lanolin ester, hydrogenated castor oil, partially hydrogenated castor oil, extremely hydrogenated soybean oil, extremely hydrogenated rapeseed oil, and other extremely hydrogenated vegetable oil, which may be used either alone or in combination.

Specific examples of the wax include, but are not limited to, petroleum-based waxes such as a paraffin wax and a microcrystalline wax; vegetable waxes such as a candelilla wax and a carnauba wax; a polyethylene wax and a hydrogenated castor oil; higher aliphatic acids such as stearic acid and behenic acid; higher alcohols; and ketones such as stearone and laurone. More preferred examples of the wax include aliphatic acid ester amide, saturated or unsaturated aliphatic acid amide, and aliphatic acid ester.

The above-described fatty acid, fatty amide, glyceride, wax, and so forth may be used in any combination, as long as having adaptability to other toner components.

Specific examples of the colorant are the same as those described above.

For mixing and dispersion of the above-described constituents, various known grinding or dispersing apparatuses may be used without any restriction. The apparatus can be classified into some groups, i.e., high-speed tumbling mills, roller mills, container drive media mills, media agitating mills, and jet mills; or cylinder rotating mills, vibrating ball mills, centrifugal ball mills, media agitating mills, and colloid mills. Specific examples of the grinding or dispersing apparatus include, but are not limited to, a cutter mill, a cage mill, a hummer mill, a centrifugal classification mill, a stamp mill, a fret mill, a centrifugal mill, a ball bearing mill, a ring rolling mill, a table mill, a rotational ball mill, a tube mill, a conical mill, a tricone mill, a pot mill, a cascade mill, a centrifugal fluid mill, an annular mill, a high speed disperser, an impeller disperser, a gate mixer, a bead mill, a sand mill, a pearl mill, a cobra mill, a pin mill, a Molyneux mill, an agitating mill, a universal mill, a Century mill, a pressure mill, an agitator mill, a two-roll extruder mill, a two-roll mill, a three-roll mill, a "niche" mill, a kneader, a mixer, a stone mill, a KD mill, a high swing mill, an annular mill, an agitation mill with an agitation tub, a vertical circulation tubing agitation mill, a ball mill, a paddle mixer, a tower mill, an attritor, a centri mill, a sand grinder, a grain mill, an attrition mill, a planetary mill, a vibrating mill, a flow jet mixer, a slasher mill, a peg mill, a micro fluidizer, a clearmix, a Rhino mill, a homogenizer, a bead mill with a pin, a horizontal-type bead mill, a pin mill, and a majack mill.

The toner constituent liquid 10 including the toner constituents mixed, ground, and dispersed by the grinding or dispersing device described above may be introduced to the liquid flow path 12 in a melt state. Thereafter, the toner constituent liquid 10 may be discharged from the holes 15 of the liquid droplet discharging means 11 to form the liquid droplets 31. Alternatively, the toner constituent liquid 10 obtained by using the grinding or dispersing device described above may be temporality cooled and solidified. The toner constituent liquid 10 thus solidified may be coarsely ground, and introduced to the liquid flow path 12 to be heated and melted. Thereafter, the toner constituent liquid 10 may be discharged from the holes 15 of the liquid droplet discharging means 11 to form the liquid droplets 31.

A description is now given of the toner constituent liquid 10 including a radiation curable material used for forming fine toner particles by forming the liquid droplets of the toner constituent liquid 10 and irradiating the liquid droplets with light to harden the liquid droplets.

Specific examples of the radiation curable material include, but are not limited to, radiation-sensitive resins or radiation curable resins such as cyclized polyisoprene, cyclized polybutadiene, poly(metha)acrylates of polyethers, cinnamates of polyvinyl alcohols, novolac resins, glycidyl polymethacrylate, and chlorinated polymethylstyrene.

The radiation curable materials are dissolved in a solvent or a monomer, and a radiation cross-linking agent or a radiation polymerization initiator is added thereto. Specific examples of the monomer include, but are not limited to, vinyl aromatic monomers such as styrene, α-methylstyrene, vinyltoluene, chlorostyrene, and divinylbenzene; acrylic monomers such as (metha)acrylic acid, methyl(metha) acrylate, n-butyl(metha) acrylate, hydroxyethyl(metha)acrylate, ethylene glycol di(metha)acrylic ester, and (metha)acrylonitrile; vinylester monomers such as vinyl formate and vinyl acetate; vinyl halide monomers such as vinyl chloride and vinylidene chloride; diallyl phthalate; and triallyl cyanurate.

The monomers may be used alone or in combination, and preferably includes stylene, (metha)acrylate, and divinylbenzene in an amount of from 0.05 to 3 parts by weight, based on 100 parts by weight of the monomer, providing good fixability and offset resistance.

Specific examples of the radiation cross-linking agent and the radiation polymerization initiator include, but are not limited to, azide compounds such as aromatic azido and trichloromethyltriazido, silver halide, bisimidazole derivatives, cyanine dyes, ketocoumarin dyes, and azo-type radical polymerization initiators such as azobisisobutyronitrile and azobisvaleronitrile.

The liquid droplets 31 of the toner constituent liquid 10 including the radiation curable material are cured while flying with a light beam having a wavelength of from an ultraviolet region to 480 nm, and more preferably from 250 to 410 nm. A high or low pressure mercury lamp may be used as a light source. The liquid droplets 31 are preferably cured by a dose of light of from several $mJ/cm^2$ to several $J/cm^2$.

Exemplary embodiments are further described in detail below with reference to examples and comparative examples, however, the present invention is not limited to the disclosed examples. In the descriptions in the following examples, the numbers represent weight ratios in parts, unless otherwise specified.

Example 1

(Preparation of Colorant Dispersion)

First, 17 parts by weight of a carbon black (REGAL® 400, from Cabot Corporation) and 3 parts by weight of a pigment dispersing agent (AJISPER PB821 from Ajinomoto Fine-Techno Co., Inc.) were added to 80 parts by weight of ethyl acetate, and primarily dispersed using a mixer having a stirring blade. The primary dispersion thus obtained was subjected to a strong shearing force using DYNO MILL to finely disperse the carbon black to prepare a secondary dispersion in which aggregates having a diameter of 5 μm or more were completely removed.

(Preparation of Wax Dispersion)

Next, 18 parts by weight of a carnauba wax and 2 parts by weight of a wax dispersing agent were added to 80 parts by weight of ethyl acetate, and primarily dispersed using a mixer having a stirring blade. The primary dispersion thus obtained was heated to 80° C. while being stirred so that the carnauba wax was melted. Thereafter, the primary dispersion was cooled down to room temperature so that wax particles having a maximum diameter of 3 μm or less were precipitated out of the primary dispersion. A polyethylene wax in which a styrene-butyl acrylate copolymer was grafted was used as the wax dispersing agent. The primary dispersion thus obtained was subjected to a strong shearing force using DYNO MILL to finely disperse the wax to obtain wax particles having a maximum diameter of 2 μm or less.

(Preparation of Toner Constituent Liquid)

Next, 100 parts by weight of a polyester resin serving as a binder resin, 30 parts by weight of the colorant dispersion (prepared above), and 30 parts by weight of the wax dispersion (prepared above) were added to 840 parts by weight of ethyl acetate, and stirred for 10 minutes using a mixer having a stirring blade to be evenly dispersed. The colorant and the wax particles were not aggregated even when the colorant and wax dispersions were diluted by the ethyl acetate.

(Preparation of Toner)

The toner constituent liquid thus obtained was supplied to the liquid droplet injection unit 102 including the horn-shaped vibration amplifying means 122 illustrated in FIGS. 11 and 12. The thin film 116 including the plurality of holes 115 each having a diameter of 8.0 μm was produced by using an electroforming technique. The holes 115 were formed in a zigzag pattern within a rectangular area having a length of 120 mm and a width of 5 mm such that an interval of 100 μm was provided between each hole 115.

The gas flow generation means 50 included the configuration illustrated in FIG. 15, and nitrogen was used as gas introduced between the gas flow path formation member 153 and the liquid droplet injection unit 102 from above through an gas leading path 157 at a pressure of 5 Kpa. The angle of introduction θ of the gas flow 155 was 135°, and the opening width D was 10 mm.

The toner constituent liquid was discharged from the holes 115, and the liquid droplets thus discharged were dried and solidified to prepare toner particles under the following conditions.

Specific gravity of dispersion: $\rho=1.154$ g/cm$^3$
Flow rate of dried gas: 30.0 L/min
Dry gas temperature at entry: 60° C.
Dry gas temperature at exit: 45° C.
Dew-point temperature: −20° C.
Vibration frequency applied to vibration generating means 121: 100 kHz The toner particles thus dried and solidified were sucked and collected by a filter having fine pores of 1 μm. A particle size distribution of the collected toner particles was measured by a flow particle image analyzer (FPIA-2000). As a result, toner particles having a weight average particle diameter of (D4) 5.4 μm and a number average particle diameter (Dn) of 5.2 μm were obtained. No adhesion of the toner constituent liquid 10 to the thin film 116 was observed after two-hour operation.

(Evaluation of Toner)

Each of the obtained toners was evaluated as follows. Table 1 shows the evaluation results.

(Particle Size Distribution)

A method for measuring a particle size distribution of toner particles using a flow particle image analyzer is described in detail below.

For example, a flow particle image analyzer FPIA-2000 manufactured by Sysmex Corporation may be used for the measurement.

Measurements were performed in the following manner. Tiny dusts in water were first removed by filtration so that 20 or less particles to be measured (e.g., particles having a circle equivalent diameter of from 0.60 μm to less than 159.21 μm) were included in 10$^{-3}$ cm$^3$ of water. A few droplets of non-ionic surfactant (preferably "CONTAMINON N" manufactured by Wako Pure Chemical Industries, Ltd.) and 5 mg of a sample were added to 10 ml of the water. Subsequently, the mixture was dispersed using an ultrasonic dispersing machine (UH-50 manufactured by SMT Co., Ltd.) for 1 minute at 20 kHz and 50 W/10 cm$^3$. The dispersion continued for further 5 minutes, preparing a sample solution including 4,000 to 8,000 particles per 10$^{-3}$ cm$^3$ of the water, the particles with a circle equivalent diameter of from 0.60 μm to less than 159.21 m. Thereafter, the particle size distribution of the particles was determined as follows.

The sample solution was allowed to flow through a flat, transparent flow cell having a thickness of about 200 μm that extends in the flow direction. A flash lamp and a CCD camera were arranged on opposite sides of the flow cell to establish an optical path that crosses the flow cell. While the sample solution was running, a strobe light flashed at 1/30-second intervals to obtain a 2D image of each particle in the flow cell at a parallel range. By calculating the diameter of a circle that has the same area as the 2D image, the circle equivalent diameter of the particle was determined.

The circle equivalent diameters of 1,200 or more particles was determined in about 1 minute, and the number and ratio (% by number) of particles with a specified circle equivalent diameter was determined on the basis of the circle equivalent diameter distribution. Measurement results (frequency distribution (%) and cumulative distribution (%)) were obtained by dividing a particle size range (from 0.06 μm to 400 μm) into 226 channels (30 channels per octave). In actual measurements, particles with a circle equivalent diameter of from 0.60 μm to less than 159.21 μm were subjected to measurements.

(Thin-Line Reproductivity)

The toner was supplied to a modified machine of which the developing unit of a commercially available copier (IMAGIO NEO 271, manufactured by Ricoh Company, Ltd.) was modified. Using paper sheets of TYPE 6000 (manufactured by Ricoh Company Ltd.), printing was continuously performed with an image having an image rate of 7%. The 10th image sheet of paper obtained at the early stage of the printing and the 30,000th image sheet of paper were visually observed, by being magnified by 100 times using an optical microscope. The two image sheets of paper were evaluated whether or not the thin lines were reproduced, comparing with a gradual print specimen. The thin line reproducibility was classified into four grades of A, B, C, and D. In Table 1, the thin line reproducibility is high in the order of A>B>C>D. Particularly, the evaluation level D was a level where it cannot be put into practical use. Here, when a negatively chargeable toner was used, an organic electrostatic latent image bearing member was used; and when a positively chargeable toner was used, an amorphous silicon electrostatic latent image bearing member was used.

A resin-coated carrier used in conventional electrophotography was used as a carrier. In particular, the following carrier was used.

(Carrier)

Core material: Spherical ferrite particles having an average particle diameter of 50 μm
Coating material: Silicone resin A silicone resin was dispersed in toluene to prepare a dispersion, and subsequently, the core material was spray-coated with the dispersion under warming condition. Thereafter, the spray-coated core material was calcined and cooled to prepare carrier particles having a resin coating layer having an average thickness of 0.2 μm.

(Discharge Stability)

The toner constituent liquid 10 was discharged under conditions described below. A discharging amount of the toner constituent liquid 10 at the start of discharge was compared with that after 2 hours from the start of discharge to evaluate a decrease in the discharging amount of the toner constituent liquid 10. Adhesion and accumulation of the toner constituents to a discharging surface were also subjected to the evaluation. In Table 1, the discharge stability of the toner constituent liquid 10 was high in the order of A>B>C>D.

Example 2

A toner was prepared in the same manner as that described in Example 1, except that gas was introduced between the gas flow path formation member 153 and the liquid droplet injection unit 102 from above through the gas leading path 157 at a pressure of 30 Kpa. As a result, toner particles having a weight average particle diameter (D4) of 5.2 μm and a number average particle diameter (Dn) of 4.9 μm were obtained. No adhesion of the toner constituent liquid 10 to the thin film 116 was observed after two-hour operation. The toner particles were evaluated in the same manner as described above, and evaluation results are shown in Table 1.

Example 3

A toner was prepared in the same manner as that described in Example 1, except that the holes 115 were formed within an area having a width of 10 mm and a length of 200 mm on the thin film 116, and five liquid droplet injection units 2 each including the above-described thin film 116 were arranged in the gas flow generation means 50. As a result, toner particles having a weight average particle diameter (D4) of 5.5 μm and a number average particle diameter (Dn) of 5.0 μm were obtained. No adhesion of the toner constituent liquid 10 to the thin film 116 was observed after two-hour operation. The toner particles were evaluated in the same manner as described above, and evaluation results are shown in Table 1.

Example 4

A toner was prepared in the same manner as that described in Example 1, except that a vibration frequency of 400 kHz was applied to the vibration generating means 121. As a result, toner particles having a weight average particle diameter (D4) of 5.5 μm and a number average particle diameter (Dn) of 5.2 μm were obtained. No adhesion of the toner constituent liquid 10 to the thin film 116 was observed after two-hour operation. The toner particles were evaluated in the same manner as described above, and evaluation results are shown in Table 1.

Comparative Example 1

A toner was prepared in the same manner as that described in Example 1, except that a vibration frequency of 400 kHz was applied to the vibration generating means 121, and gas was not introduced through the gas leading path 157. As a result, toner particles having a weight average particle diameter (D4) of 8.9 μm and a number average particle diameter (Dn) of 6.2 μm were obtained. The toner particles were evaluated in the same manner as described above, and evaluation results are shown in Table 1.

Comparative Example 2

Figure 18:
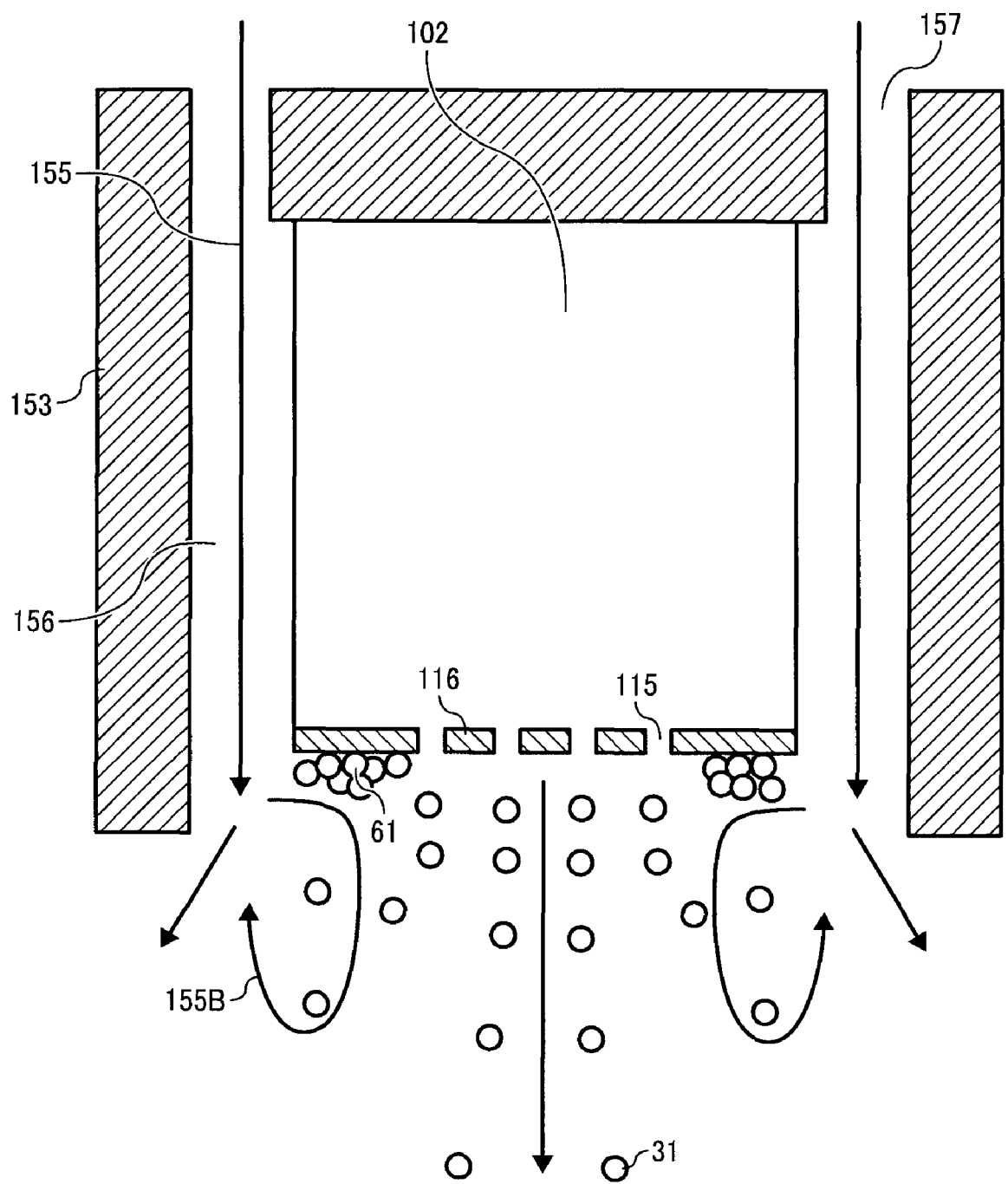
FIG. 18 is a cross-sectional view illustrating a gas flow generation means used in comparative examples.

A toner was prepared in the same manner as that described in Example 1, except that the angle of introduction θ of the gas flow 155 was set to 0°, that is, the gas flow path 156 had a straight shape as illustrated in FIG. 18, and the opening width D was set to 10 mm. As a result, as illustrated in FIG. 18, accumulation of the toner constituents 61 was observed on a surface of the thin film 116 in a short time, and the holes 115 were clogged. Consequently, discharging of the toner constituent liquid 10 was stopped. It is estimated that a swirling gas flow 155B was generated from the gas flow 155 due to the straight shape of the gas flow path 156, and the liquid droplets 31 discharged from the holes 115 were caught by the swirling gas flow 155B, preventing the liquid droplets 31 from being smoothly discharged from the holes 115.

Comparative Example 3

A toner was prepared from the toner constituent liquid 10 described in Example 1 by using a toner manufacturing apparatus having a configuration disclosed in JP 3786034. A vibration frequency of 200 kHz was applied to a vibration generating means. As a result, toner particles having a weight average particle diameter (D4) of 21.8 μm and a number average particle diameter (Dn) of 8.6 μm were obtained. The toner particles were evaluated in the same manner as described above, and evaluation results are shown in Table 1.

TABLE 1

| | Particle Diameter Distribution | | | |
|---|---|---|---|---|
| | Weight Average Particle Diameter [μm] | Number Average Particle Diameter [μm] | Thin-Line Reproducibility | Discharge Stability |
| Ex. 1 | 5.4 | 5.2 | A | A |
| Ex. 2 | 5.2 | 4.9 | A | A |
| Ex. 3 | 5.5 | 5.0 | B | A |
| Ex. 4 | 5.5 | 5.2 | B | A |
| Comp. Ex. 1 | 8.9 | 6.2 | C | C |
| Comp. Ex. 2 | — | — | — | D |
| Comp. Ex. 3 | 21.8 | 8.6 | D | B |

As is clear from Table 1, the toner can be effectively manufactured by the method for manufacturing a toner according to the present invention, and properties of the toner manufactured by such a method are extremely excellent. Furthermore, the images obtained by developing and forming the images using the toner of the present invention are extremely faithful to the latent electrostatic images and are excellent in image quality.

As can be appreciated by those skilled in the art, numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2007-130926 filed on May 16, 2007 in the Japan Patent Office, the entire contents of which are hereby incorporated herein by reference.

What is claimed is:

1. An apparatus for manufacturing a toner, comprising:
a liquid droplet formation unit that periodically forms liquid droplets of a toner constituent liquid comprising a resin and a colorant, and vibrates a thin film having a plurality of holes provided on a retention part, to discharge the liquid droplets of the toner constituent liquid from the plurality of holes;

a toner particle formation unit that forms toner particles by solidifying the liquid droplets of the toner constituent liquid discharged from the plurality of holes; and a gas flow generation unit that forms a flow of gas in a direction of discharge of the liquid droplets of the toner constituent liquid provided downstream from the thin film relative to the direction of discharge of the liquid droplets, the gas flow generation unit comprising a tapered part forming an aperture corresponding to a hole formation area of the thin film.

2. The apparatus for manufacturing a toner according to claim 1, wherein a speed of the gas flow at the tapered part is faster than an initial speed of discharge of the liquid droplets of the toner constituent liquid discharged from the plurality of holes.

3. The apparatus for manufacturing a toner according to claim 1, wherein the liquid droplet formation unit comprises an annular vibration generating unit provided surrounding a deformable area of the thin film to vibrate the thin film.

4. The apparatus for manufacturing a toner according to claim 1, wherein the liquid droplet formation unit comprises a vibration unit comprising a vibration generating unit that generates vibration and a vibration amplifying unit that amplifies the vibration generated by the vibration generating unit, a vibration surface of the vibration unit being provided parallel to the thin film with the toner constituent liquid therebetween to vibrate the thin film.

5. The apparatus for manufacturing a toner according to claim 1, wherein the toner particle formation unit dries and solidifies the liquid droplets of the toner constituent liquid.

6. The apparatus for manufacturing a toner according to claim 5, wherein the liquid droplets are dried by gas flowing in the direction of discharge of the liquid droplets.

7. The apparatus for manufacturing a toner according to claim 6, wherein the dry gas is either air or nitrogen.

8. The apparatus according to claim 1, wherein the gas flows via a gas flow path through the gas flow generation unit, and the tapered part constricts or narrows the gas flow path at the aperture so that a cross-sectional area of the gas flow path at the aperture is smaller than a cross-sectional area of the gas flow path at a source of the gas.

9. A method for manufacturing a toner using the apparatus of claim 1, comprising:

periodically forming the liquid droplets of the toner constituent liquid comprising the resin and the colorant, and vibrating the thin film having the plurality of holes, to discharge the liquid droplets of the toner constituent liquid from the plurality of holes; and forming toner particles by solidifying the liquid droplets discharged from the plurality of holes, wherein, in periodically forming the liquid droplets of the toner constituent liquid, a flow of gas in a direction of discharge of the liquid droplets is formed by the gas flow generation unit provided on a downstream side from the thin film relative to the direction of discharge of the liquid droplets, the gas flow generation unit comprising the tapered part forming the aperture corresponding to the hole formation area of the thin film.

10. The method for manufacturing a toner according to claim 9, wherein a speed of the gas flow at the tapered part is faster than an initial speed of discharge of the liquid droplets discharged from the plurality of holes.

11. The method for manufacturing a toner according to claim 9, wherein the thin film is vibrated by an annular vibration generating unit provided surrounding a deformable area of the thin film.

12. The method for manufacturing a toner according to claim 9, wherein the thin film is vibrated by a vibration unit comprising a vibration generating unit that generates vibration and a vibration amplifying unit that amplifies the vibration generated by the vibration generating unit, a vibration surface of the vibration unit being provided parallel to the thin film with the toner constituent liquid therebetween to vibrate the thin film.

13. The method for manufacturing a toner according to claim 9, wherein the liquid droplets of the toner constituent liquid are dried and solidified in forming toner particles.

14. The method for manufacturing a toner according to claim 13, wherein the liquid droplets are dried by a dry gas flowing in the direction of discharge of the liquid droplets.

15. The method for manufacturing a toner according to claim 14, wherein the dry gas is either air or nitrogen.

* * * * *